(12) United States Patent
Riccio et al.

(10) Patent No.: US 11,399,225 B2
(45) Date of Patent: *Jul. 26, 2022

(54) MODULAR COMMUNICATION DEVICE

(71) Applicant: Lucca Ventures, Inc., Southington, CT (US)

(72) Inventors: Lucca Riccio, Southington, CT (US); Michael Riccio, Southington, CT (US); Daniel Dean Briere, Mansfield Center, CT (US); Timothy Corcoran Repp, Barkhamsted, CT (US)

(73) Assignee: Lucca Ventures, Inc., Southington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/672,778

(22) Filed: Feb. 16, 2022

(65) Prior Publication Data
US 2022/0174385 A1 Jun. 2, 2022

Related U.S. Application Data

(63) Continuation of application No. 17/466,119, filed on Sep. 3, 2021, now Pat. No. 11,284,175.

(60) Provisional application No. 63/074,144, filed on Sep. 3, 2020.

(51) Int. Cl.
*H04R 1/02* (2006.01)
*H04R 1/08* (2006.01)
*H04R 5/027* (2006.01)
*H04W 4/80* (2018.01)

(52) U.S. Cl.
CPC ............... *H04R 1/026* (2013.01); *H04R 1/08* (2013.01); *H04R 5/027* (2013.01); *H04W 4/80* (2018.02); *H04R 2420/07* (2013.01)

(58) Field of Classification Search
CPC . H04R 1/00; H04R 1/02; H04R 1/026; H04R 1/028; H04R 1/08; H04R 1/083; H04R 3/00; H04R 3/04; H04R 2420/07; H04R 5/027; H04W 4/80; A62B 7/00; A62B 9/04; A62B 9/06; A62B 18/00; A62B 18/02; A62B 18/08; A61M 16/00; A61M 16/01; A61M 16/06
See application file for complete search history.

(56) References Cited

U.S. PATENT DOCUMENTS

| | | | | |
|---|---|---|---|---|
| 7,234,462 B2 * | 6/2007 | Palazzotto | ............. | A62B 18/08 128/205.27 |
| 7,302,072 B2 * | 11/2007 | Skillicorn | ................ | H04R 1/08 381/364 |
| 9,498,658 B2 * | 11/2016 | Kihlberg | .................. | H03G 5/00 |
| 10,857,399 B2 * | 12/2020 | Riccio | .................... | A62B 18/08 |
| 11,284,175 B1 * | 3/2022 | Riccio | .................... | H04R 5/027 |
| 2021/0402226 A1 * | 12/2021 | Shear | ..................... | A62B 18/08 |
| 2022/0030340 A1 * | 1/2022 | Demske | .................. | H04R 1/04 |

* cited by examiner

*Primary Examiner* — Thang V Tran
(74) *Attorney, Agent, or Firm* — Wiggin and Dana LLP; Brian A. Pattengale; Anthony D. Sabatelli

(57) ABSTRACT

The present disclosure presents a communication device configured to removably attach to a mask, and to receive, transmit, and amplify sound and/or speech from a wearer.

20 Claims, 26 Drawing Sheets

MODULAR COMMUNICATION DEVICE

CROSS-REFERENCE TO RELATED APPLICATION

This patent application is a continuation of U.S. patent application Ser. No. 17/466,119 filed Sep. 3, 2021, which claims priority to U.S. Provisional Application No. 63/074,144, filed Sep. 3, 2020, all of which are herein incorporated by reference in their entirety.

FIELD OF THE INVENTION

The invention relates to modular communication devices for use with mouth, nose, face, and head coverings, including masks. Modern societal health concerns often require the use of such coverings and/or masks to protect a wearer from exposure to external air, liquids, particulate, pathogenic, or other harmful substances. Although masks may protect a wearer, masks also hinder communication by reducing or muffling the wearer's voice. The disclosure provides a modular communication device that can be attached to a disposable or reusable mask and allow a user's voice to be amplified outside of the mask.

BACKGROUND OF THE INVENTION

The present disclosure relates to modular communication devices for use with face masks and/or coverings, with examples being N95 respirators; procedural, surgical and cloth face masks; face shields; cloth coverings such as bandanas; and continuous positive air pressure (CPAP) or other (e.g., bi-level positive airway pressure (BiPAP)) devices including masks and hoods. These modular communication devices may include a microphone, the microphone configured to interface with a wired or wireless speaker and/or a wired or wireless communications device, such as a telephone.

In almost all settings, the use of a face mask and/or covering restricts the ability to communicate naturally; coherent conversation with others or via telephone is universally difficult. This difficulty is due, at least in part, to the intervening plastic, cloth or other material, as well as to noise of the airflow and machinery and other environmental noise.

Accordingly, there is a need in the art for a modular communication device that is configured to pick up the mask wearer's speech from within the mask or associated accessories, utilizing one or more microphones, and transmitting that speech to a speaker or other communications device to makes one's voice heard. This communications capability/device might take the form of a coupler, a pair of magnetized devices, a clip-on or pin-on attachment, a bone conductive microphone device, a throat microphone device, or many other such exemplary implementations.

SUMMARY OF THE INVENTION

The above-described and other problems and disadvantages of the prior art are overcome or alleviated by the present mask communications device that includes one or more microphones, the microphone(s) configured to interface with a wired or wireless speaker and/or a wired or wireless communications device, such as a telephone.

In exemplary embodiments, the microphone is a noise-cancelling microphone. In further embodiments, the microphone includes or is associated with at least one noise filter. In further exemplary embodiments, one or more of the microphone, speaker and communications device is in a wireless configuration.

In further exemplary embodiments, an on-board speaker is integrated into a portion of the respiratory mask communications device. In further exemplary embodiments, a speaker is external to the mask communications device. In additional exemplary embodiments, the respiratory mask includes one or more integrated and/or coupler adapted noise cancelling microphones with wireless, e.g., Bluetooth®, capability. In further exemplary embodiments, the microphone signal is processed utilizing noise-cancelling sound processing. In exemplary embodiments, the microphone is attached to or built into a respiratory mask or mask fluid delivery tube. In other embodiments, the microphone is a throat microphone or a bone conduction microphone.

In additional exemplary embodiments, the respiratory mask includes a coupler between a fluid delivery tube and a facial mask portion, the coupler including one or more of a microphone, speaker, wiring, processor, or communications device. In exemplary embodiments, one or more of the preceding elements are embedded in or provided through a portion of the coupler. In further exemplary embodiments, one or more of the elements described herein are embedded in or provided through a device connected to the coupler via power and/or signal wiring.

In further exemplary embodiments, the microphone is configured to wirelessly transmit a patient's voice, via Bluetooth® technology, to a Bluetooth® speaker in proximity to and in communication with the Bluetooth® transmitter. In further exemplary embodiments, the microphone is configured to wirelessly transmit a patient's voice, via Bluetooth® technology, to a Bluetooth®-enabled smartphone in proximity to and in communication with the Bluetooth® speaker and/or the Bluetooth® transmitter. While a Bluetooth® speaker and an exemplary Bluetooth® smartphone are specifically described, the present disclosure contemplates other Bluetooth® communications devices. And while Bluetooth® is specifically described, the present disclosure contemplates other wireless technologies, including but not limited to Wi-Fi.

In additional exemplary embodiments is a communication device for releasable securement to a flexible mask, the device comprising: a microphone configured to receive speech from the mask wearer; a speaker configured to broadcast speech from the mask wearer; a power indicator [such as an LED power indicator or lighted indicator]; a printed circuit board (PCB) assembly including the speaker; a power source for supplying power to the device; a device control element; a housing comprising a front housing component and a back housing component, wherein the front housing component has an opening adapted to receive a speaker cover, wherein zo the back housing component comprises a microphone opening for permitting speech to reach the microphone, and wherein the front and back housing components are configured to engage with each other to hold the microphone, the speaker, the power indicator, the PCB assembly, the power source, and the device control element; a first magnetic attachment component associated with the back housing; a mask clip for mating with the back housing component; and a second magnetic attachment component associated with the mask clip; wherein at least one of the first and second magnetic attachment components is a magnet and the first and second magnetic attachment components are arranged to produce an attractive force and to engage the back housing component with the mask clip. In these exemplary embodiments, the flexible mask is interposed between the back housing component of the housing and the mask clip.

In additional exemplary embodiment the power source can be a rechargeable power source.

In additional exemplary embodiments of the device, the magnetic attachment components are selected from the group consisting of a magnet, a ferromagnetic material, and a ferrimagnetic material.

In additional exemplary embodiments the mask clip comprises a hang loop at one end. The hang loop can be used for holding or positioning the device and for hanging it to a wearer's clothing when not in use.

In additional exemplary embodiments the device control element comprises at least one of a power control, a volume control, and a mute control.

In additional exemplary embodiments the device further comprises a mask clip for engaging the back housing component, wherein at least one of the mask clip and the back housing component comprises a stabilizing protrusion for mating with an opening on the other, and wherein the back housing and mask clip when in an engaged state with the flexible mask interposed therebetween, engage with sufficient force to cause the flexible mask to conform to the stabilizing protrusion and the opening.

In additional exemplary embodiments the microphone comprises two microphones and the two microphones are spaced apart from the speaker at a distance to minimize feedback.

In additional exemplary embodiments is a communication device for releasable securement to a flexible mask, the device comprising: a microphone configured to receive speech from a wearer of the flexible mask; a speaker configured to broadcast the speech received by the microphone; a power source for supplying power to the device; a housing comprising a front housing component and a back housing component, wherein the front and back housing components are configured to engage with each other to hold the microphone, the speaker, and the power source; a mask clip releasably securable to the housing; a first magnetic attachment component associated with the back housing component; and a second magnetic attachment component associated with the mask clip; wherein the first and second magnetic attachment components are arranged to produce an attractive force sufficient to couple the housing to the mask clip with the flexible mask interposed therebetween. Furthermore, the magnetic attachment components can be selected from the group consisting of a magnet, a ferromagnetic material, and a ferrimagnetic material.

In additional exemplary embodiments the device further comprises a control element for controlling at least one of power and volume. Furthermore the control element can also mute the device.

In additional exemplary embodiments the microphone comprises a plurality of microphones and each of the microphones is spaced apart from the speaker at a distance to minimize feedback.

In additional exemplary embodiments the device further comprises a circuit assembly comprising a wireless transmitter.

In additional exemplary embodiments the wireless transmitter is a Bluetooth transmitter. Although a Bluetooth transmitter can be employed any other type of transmitter that performs a similar function can be used.

In additional exemplary embodiments the microphone and speaker are disposed on a same side of the flexible mask.

In additional exemplary embodiments the mask clip is configured for positioning on the inside of the flexible mask.

In additional exemplary embodiments the device is of a size and weight sufficient for attachment to the flexible mask until removed from the mask.

In additional exemplary embodiments the device is of a size and weight sufficient for attachment to the flexible mask for a period of at least 30 minutes. However, the device should be of a size and weight so that it is comfortable for the user, such that it can be attached to the flexible mask for as long as a user may want to have it attached. The size and weight of the device should be such so that it can be attached without a concern for removal because of discomfort to the user or distortion of the mask, which could impede the performance of the mask.

In additional exemplary embodiments the device has a total weight that does not exceed 25 grams.

In additional exemplary embodiments the device has a total weight not exceeding 17 grams.

In additional exemplary embodiments the device has a length of from about 40 mm to about 60 mm, a width of about 20 mm to about 40 mm, and a depth of about 20 mm to about 40 mm. In additional exemplary embodiments the device has a length of about 50 mm, a width of about 30 mm, and a depth of about 30 mm.

In additional exemplary embodiments is an under-chin [L-shaped] mountable device for communicating with a mask wearer, the device comprising: a microphone configured to receive speech from the mask wearer; a speaker configured to broadcast speech from the mask wearer; a power indicator; a charging port; a rechargeable power source for supplying power to the device; a substantially L-shaped housing configured to conform to a human chin, the housing comprising a front housing component and a back housing component, wherein the back housing component comprises a microphone opening for permitting speech to reach the microphone, and wherein the front and back housing components are configured to be connected to hold the microphone, the speaker, the power indicator, and the rechargeable power source; and wherein the device has a total weight sufficient for attachment of the device to a flexible mask for a period of at least about 30 minutes, more preferably at least about 60 minutes, and the total weight not exceeding 25 grams, preferably not exceeding 17 grams.

In additional exemplary embodiments the L-shaped under chin device further comprises a mask clip for engaging the housing, wherein at least one of the mask clip and the housing comprises a stabilizing protrusion for mating with an opening on the other and wherein the housing and mask clip when in an engaged state with the flexible mask interposed therebetween engage with sufficient force to cause the flexible mask to conform to the engaged stabilizing protrusion and opening.

In additional exemplary embodiments the L-shaped under chin device further comprises a first magnetic attachment component associated with the back housing component and a second magnetic attachment component associated with the mask clip; wherein at least one of the first and second magnetic attachment components is a magnet and the first and second magnetic attachment components are arranged to produce an attractive force and to engage the back housing with the mask clip. In these exemplary embodiments, the flexible mask is interposed between the housing and the mask clip. Furthermore, the magnetic attachment components can be selected from the group consisting of a magnet, a ferromagnetic material, and a ferrimagnetic material.

In additional exemplary embodiments the L-shaped under chin device controls comprise of at least one of a power control, a volume control, and a mute control.

In additional exemplary embodiments the L-shaped under chin device has a total weight that preferably does not exceed 17 grams.

In additional exemplary embodiments is a system for communicating with a flexible mask wearer, the system comprising: a flexible mask; and a communications device; the communications device comprising: a microphone configured to receive speech from a wearer of the flexible mask; a speaker configured to broadcast the speech received by the microphone; a power source for supplying power to the device; a housing comprising a front housing component and a back housing component, wherein the front and back housing components are configured to engage with each other to hold the microphone, the speaker, and the power source; a mask clip releasably securable to the housing; a first magnetic attachment component associated with the back housing component; and a second magnetic attachment component associated with the mask clip; wherein the first and second magnetic attachment components are arranged to produce an attractive force sufficient to couple the housing to the mask clip with the flexible mask interposed therebetween. Furthermore, the magnetic attachment components can be selected from the group consisting of a magnet, a ferromagnetic material, and a ferrimagnetic material.

In additional exemplary embodiments of the system the device further comprises a circuit assembly comprising a wireless transmitter.

In additional exemplary embodiments the system further comprises a portable mobile communications device.

In additional exemplary embodiments the mask is selected from the group consisting of a cloth mask, fabric mask, disposable mask, single-use mask, surgical mask, procedure mask, medical mask, plastic mask, dust mask, filter mask, respirator mask, respiratory mask, oxygen mask, KN95 mask, N95 mask, surgical N95 mask, N99 mask, KN99 mask, N100 mask, KN100 mask, R95 mask, P95 mask, P100 mask, PM2.5 mask, FFP1 mask, FFP2 mask, FFP3 mask, a CPAP mask, a BiPAP mask, multilayered mask, mask with removable filter, a face covering, handkerchief, kerchief, veil, hood, bandana, mask with fitter, mask with brace, and combinations and layered arrangements thereof.

In additional embodiments, the system can be packaged and marketed as a kit comprising one or more masks in conjunction with a device of the present invention.

In additional embodiments, the present invention is also directed to facilitating communication using any of the devices disclosed herein.

The above-discussed and other features and advantages of the present invention will be appreciated and understood by those skilled in the art from the following detailed description and drawings.

BRIEF DESCRIPTION OF THE DRAWINGS

Referring now to the drawings, wherein like elements are numbered alike in the following figures.

DETAILED DESCRIPTION OF THE INVENTION

Figure 1:
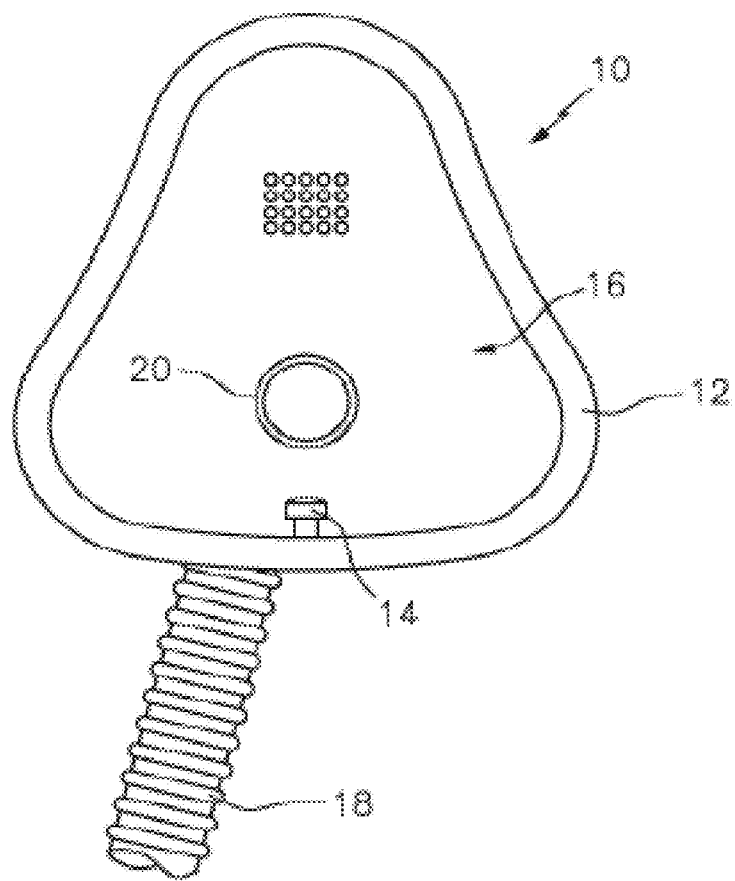
FIG. 1 is a rear elevation view of an exemplary respiratory mask including a microphone in accordance with exemplary embodiments of the present disclosure.

The details of one or more embodiments of the invention are set forth in the accompanying description below. Although any materials and methods similar or equivalent to those described herein can be used in the practice or testing of the present invention, the preferred materials and methods are now described. Other features, objects and advantages of the invention will be apparent from the description. In the description, the singular forms also include the plural unless the context clearly dictates otherwise. Unless defined otherwise, all technical and scientific terms used herein have the same meaning as commonly understood by one of ordinary skill in the art to which this invention belongs. In the case of conflict, the present description will control.

As was noted above, the present disclosure, in some embodiments, relates to a patient respiratory mask that includes a microphone disposed thereon, the microphone is configured to interface with a wired or wireless speaker and/or a wired or wireless communications device, such as a telephone. In some embodiments, the present disclosure relates to modular communication devices for use with mouth, nose, face, and head coverings, including masks. The disclosure provides for a modular communication device that can be attached to a disposable or reusable mask or face covering and allow a user's voice to be amplified outside of the mask. While the following is described in reference to various exemplary embodiments, the present disclosure is not so limited.

In some exemplary embodiments, the microphone is a noise-cancelling microphone. In further embodiments, the microphone includes or is associated with at least one noise filter. In further exemplary embodiments, one or more of the microphone, speaker and communications device is wireless. It is to be understood that reference to a component, such as a microphone, speaker, etc., as being wireless or transmitting wirelessly encompasses configurations wherein such device is zo connected to a component that includes a wireless transmitter and/or receiver.

Accordingly, any reference herein to a "wireless" component should be read to encompass such a construction. In further exemplary embodiments, an on-board speaker is integrated into a portion of the respiratory mask. In further exemplary embodiments, a speaker is external to the mask.

As we have noted, in exemplary embodiments, the patient respiratory mask includes an internal and/or coupler- or tube-adapted noise-cancelling microphone with wireless, e.g., Bluetooth®, capability. In exemplary embodiments, the microphone is attached to or built into a respiratory mask, a coupler designed to attach to the mask tube interface, or mask fluid delivery tube (e.g., for oxygen, air or some other gas). In additional exemplary embodiments, the coupler includes one or more of a microphone, a speaker, wiring, processor and a communications device. In exemplary embodiments one or more of the preceding elements are embedded in or provided through a portion of the coupler.

As discussed above, further exemplary embodiments, the microphone wirelessly transmits a patient's voice, via Bluetooth® technology, to a Bluetooth® speaker in proximity to and in communication with the Bluetooth® transmitter. Reference herein to a "Bluetooth®" device refers to a device that is enabled to use Bluetooth® technology. In further exemplary embodiments, the microphone wirelessly transmits a patient's voice, via Bluetooth® technology, to a Bluetooth® smartphone in proximity to and in communication with the Bluetooth® speaker and/or Bluetooth® transmitter. While a Bluetooth® speaker and an exemplary Bluetooth® smartphone are specifically described, the present disclosure contemplates other Bluetooth® communications devices.

Referring now to FIG. 1, one exemplary patient respiratory mask in accordance with the present disclosure includes an exemplary microphone provided therein. In exemplary embodiments, the respiratory mask is a CPAP (or BIPAP) respiratory mask, shown generally at 10, with a mask portion 12 and a Bluetooth® microphone 14 that is incorporated within a fluid airspace, shown generally at 16, of the mask 10 near the mouth (not shown) of a patient. The exemplary mask also includes a fluid delivery tube 18 and at least one mask inlet 20.

In exemplary embodiments, the microphone 14 is mounted on or is provided within the material of the mask. In another exemplary embodiment, the microphone is provided in a separate microphone tube (not shown) that may extend at least partially into the fluid airspace of the mask 10. In further exemplary embodiments, the microphone tube is at least partially sealed, for example via plastic or a membrane that is at least moderately transparent to sound but that also separately maintains the integrity of the fluid airspace 16 within the respiratory mask 10.

Such an exemplary microphone tube may be provided within or be mounted to the respiratory mask 10, a fluid delivery tube 18, or any coupler 22 or portions intermediate the fluid delivery tube 18 the respiratory mask 10.

Figure 2:
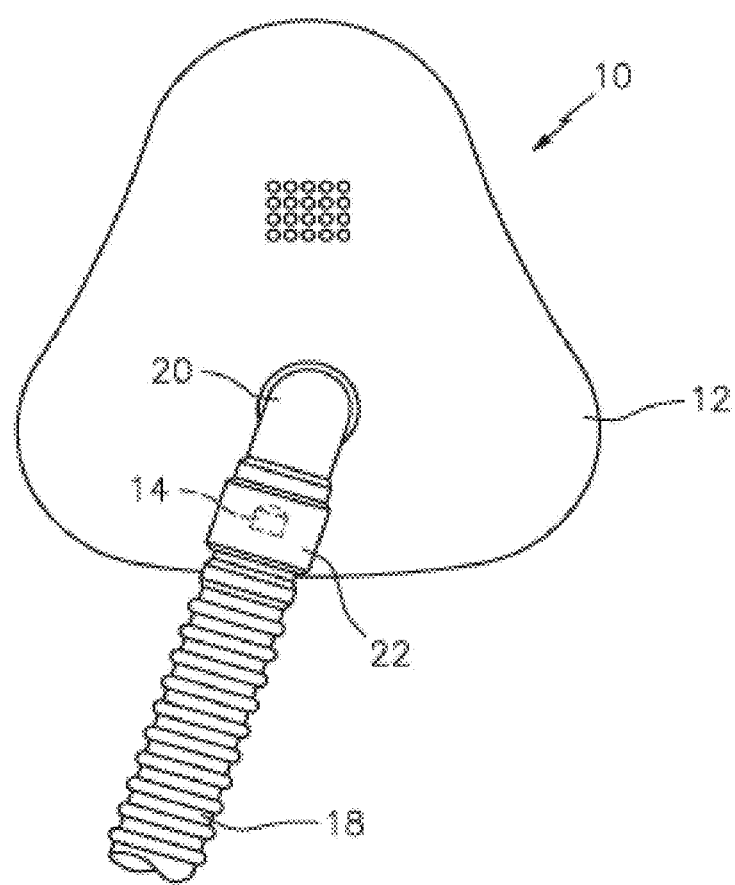
FIG. 2 is a perspective view of an exemplary respiratory mask utilizing a microphone coupler provided on the fluid delivery tube near the respiratory mask in accordance with exemplary embodiments of the present disclosure.
Figure 3:
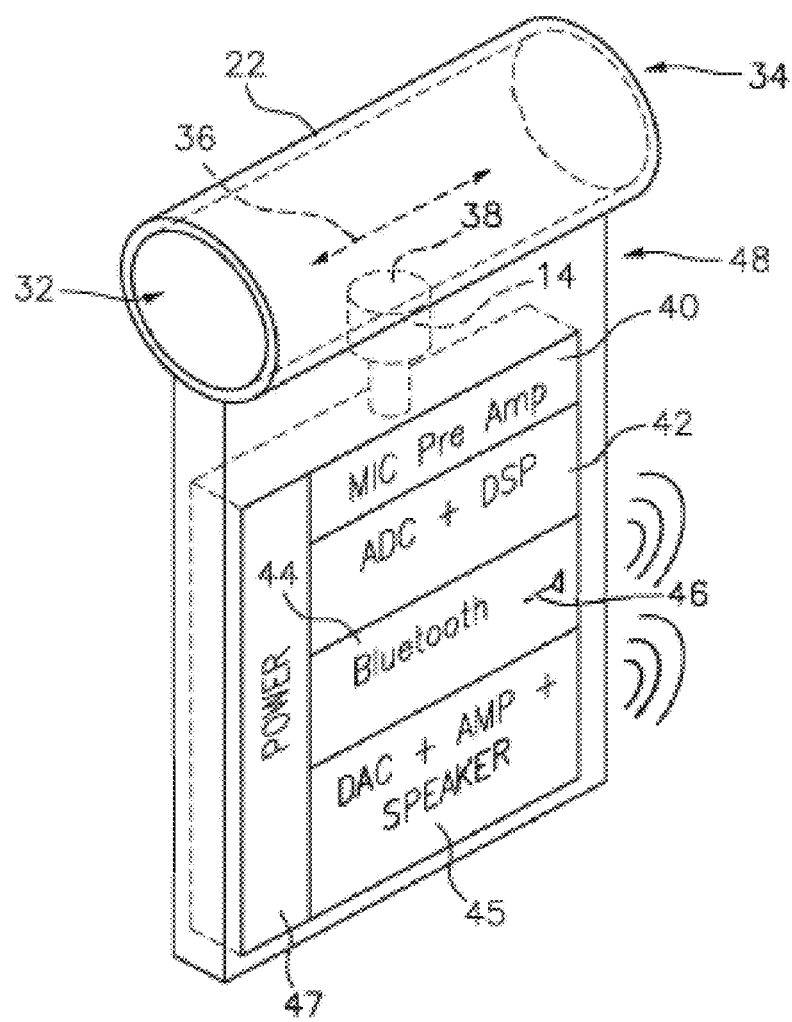
FIG. 3 is a perspective view of an exemplary coupler device incorporating a microphone, including a schematic of communications components for the coupler in accordance with exemplary embodiments of the present disclosure.

Referring now to FIG. 2, another exemplary patient respiratory mask 10 incorporates such Bluetooth® microphone 14 into a coupler device 22 that is positioned between the fluid delivery tube 18 and the respiratory mask 10. In exemplary embodiments, the coupler 22 is sized and configured to provide a friction fit for the mask inlet 20 on one side and for the fluid delivery tube 18 on the other side. Referring to FIG. 3, an exemplary coupler 22 includes a mask inlet side, shown generally at 32, a fluid supply tube side, shown generally at 34, with bulk air flow traversing the interior of the tube generally at the arrows of 36.

In an exemplary embodiment, a microphone 14 is separated from the bulk air flow 36 by a filter 38, which may be configured to filter one or more sound characteristics or to simply shield the microphone from bulk air flow. The filter 38 may be a membrane, acoustic mesh, or any other convenient sound transmitting material.

In the illustrated exemplary embodiment, the microphone is illustrated as being operatively connected to a microphone pre-amplifier 40, an equalization component 42 [for example an analog to digital converter (ADC) and digital signal processor (DSP)], a Bluetooth® transmitter 44, a sound output component, such as a digital to analog converter (DAC), amplifier (Amp) and speaker 45, an antenna 46 and a power supply 47, such as a battery or wired power adapter. These components are illustrated in this exemplary embodiment as being both connected to the microphone and as being housed on a protruding portion 48 of the coupler 22. However, it should be recognized that the microphone may be configured on-board the coupler 22 with more or fewer associated components, with some components or processes omitted or performed elsewhere, e.g., on the exterior of the coupler 22, remote from the coupler 22, etc.

Additionally, the coupler can take any convenient shape when housing such components, as long as connecting portions 32 and 34 are configured to connect to the mask inlet 20 and the fluid delivery tube 18, respectively.

In exemplary embodiments, the coupler may be configured to attach to the fluid delivery tube, regardless of any variation in tube diameter (e.g., differences in configurations warranting use of a 19 mm standard tube vs. a 15 mm thin tube). Thus, exemplary embodiments provide a universal attachment (e.g., as a clip on, etc., as shown in FIG. 4) configured to fit a wide array of tubes and breathing apparatuses.

Figure 4A:
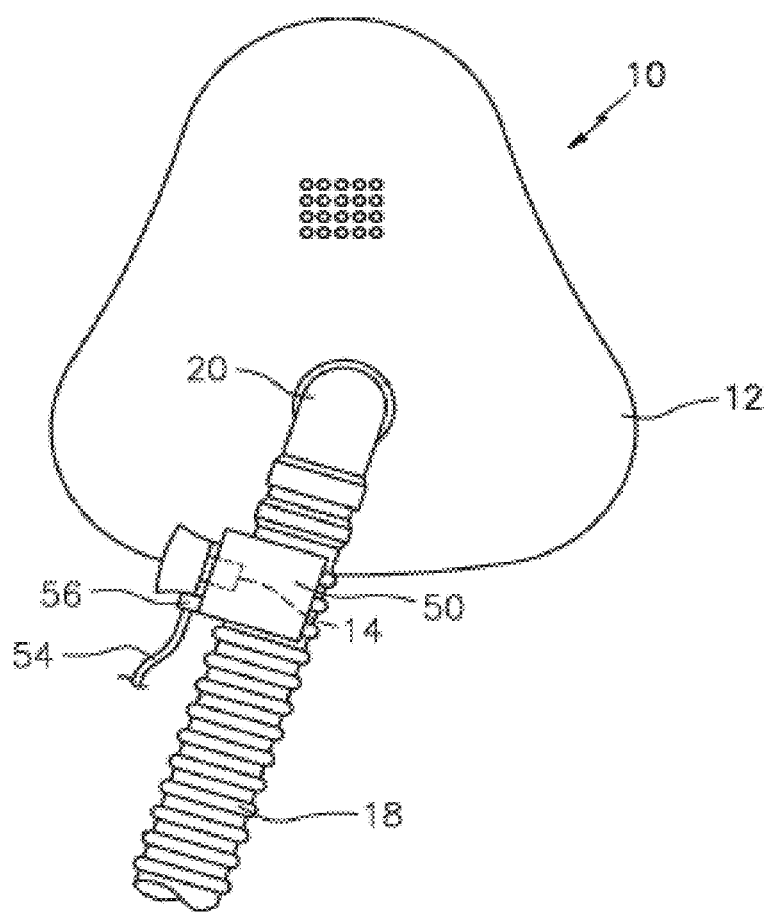
FIG. 4A is a perspective view of an exemplary clip-on accessory including a microphone in accordance with the exemplary embodiments of the present disclosure.
Figure 4B:
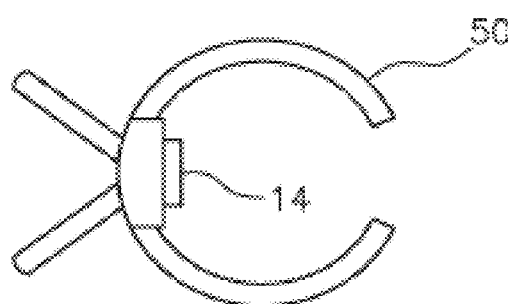
FIG. 4B is a side elevation view of an exemplary clip-on accessory including a microphone in accordance with the exemplary embodiments of the present disclosure.

In other exemplary embodiments, the microphone or other electronic components are configured to attach externally (for example as a clip-type attachment, among others) to the respiratory mask 10 but in close proximity to the patient's fluid airspace (see 16 in FIG. 1). Referring now to FIG. 4A, a clip 50 is illustrated with a microphone unit 14 provided on an underside of the clip. In exemplary embodiments, the clip 50 also interfaces with a power and signal wire 54 via a port 56. While such a clip may be configured to attach anywhere that is convenient to place the microphone unit 14 near a sound transmitting surface, for example the inlet portion 20 of mask 10 or an exterior portion of a coupler 22, FIG. 4 illustrates provision of the clip 50 over a portion of the fluid deliver hose 18, with the microphone unit against or proximate the material of the hose to pick up sound vibrations transmitted through the hose. It should be recognized that while FIG. 4 illustrates a wired configuration, the microphone unit can also be configured with a battery and a wireless (e.g., Bluetooth®) transmitter. FIG. 4B illustrates an exemplary side elevation view of the clip 50, with microphone 14 positioned to be near tube 18 in an installed position.

Figure 5:
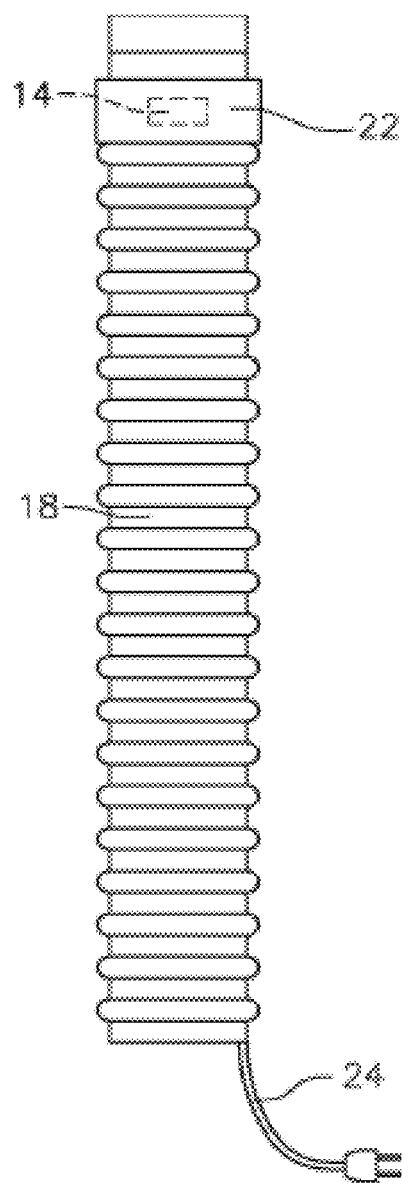
FIG. 5 is a front elevation view of an exemplary wired tube and respiratory mask coupler including a microphone in accordance with exemplary embodiments of the present disclosure.

Referring now to FIG. 5, a fluid delivery tube 18 is illustrated as including an integrated coupler 22 that incorporates a microphone 14 (see FIG. 2) therein and is attachable to or integral to respiratory fluid delivery tube 18. An exemplary power cord 24 runs at least along a portion of the tube 18 to the microphone 14 (which may be configured in a wired or wireless, e.g., Bluetooth®, arrangement). As we have noted above, the coupler may also include other components, such as processing or filtering components, a wireless transmitter, etc., in addition to or alternative to the microphone, such as a speaker, wiring or any other type of communications device.

In further embodiments, the microphone 14 may be configured as a wired microphone utilizing the exemplary cord 24 or another cord for data transmission. In additional exemplary embodiments, the microphone may be wireless and may be connected to a battery source, with no cords running along a portion of the tube 18.

Figure 6:
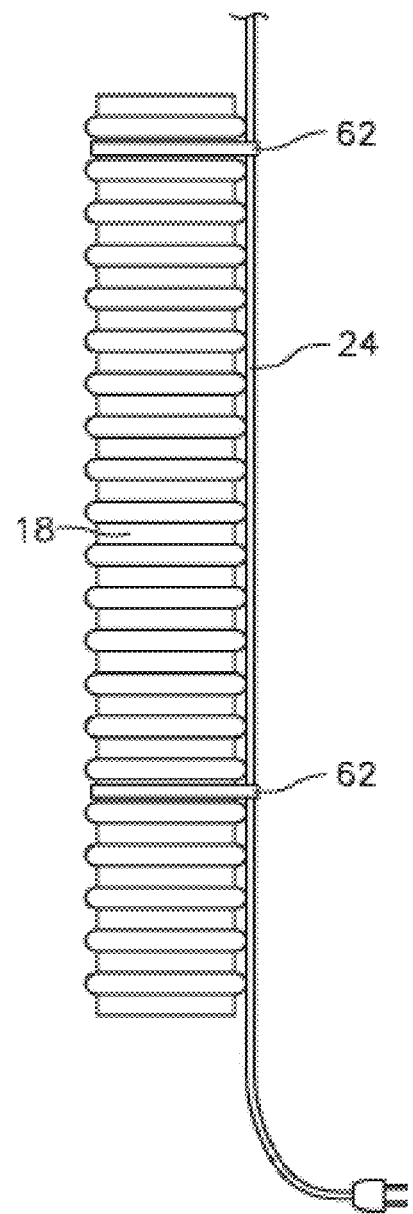
FIG. 6 is a side elevation view of exemplary tube and cord lengths secured to one another via multiple harness clips in accordance with exemplary embodiments of the present disclosure.
Figure 7:
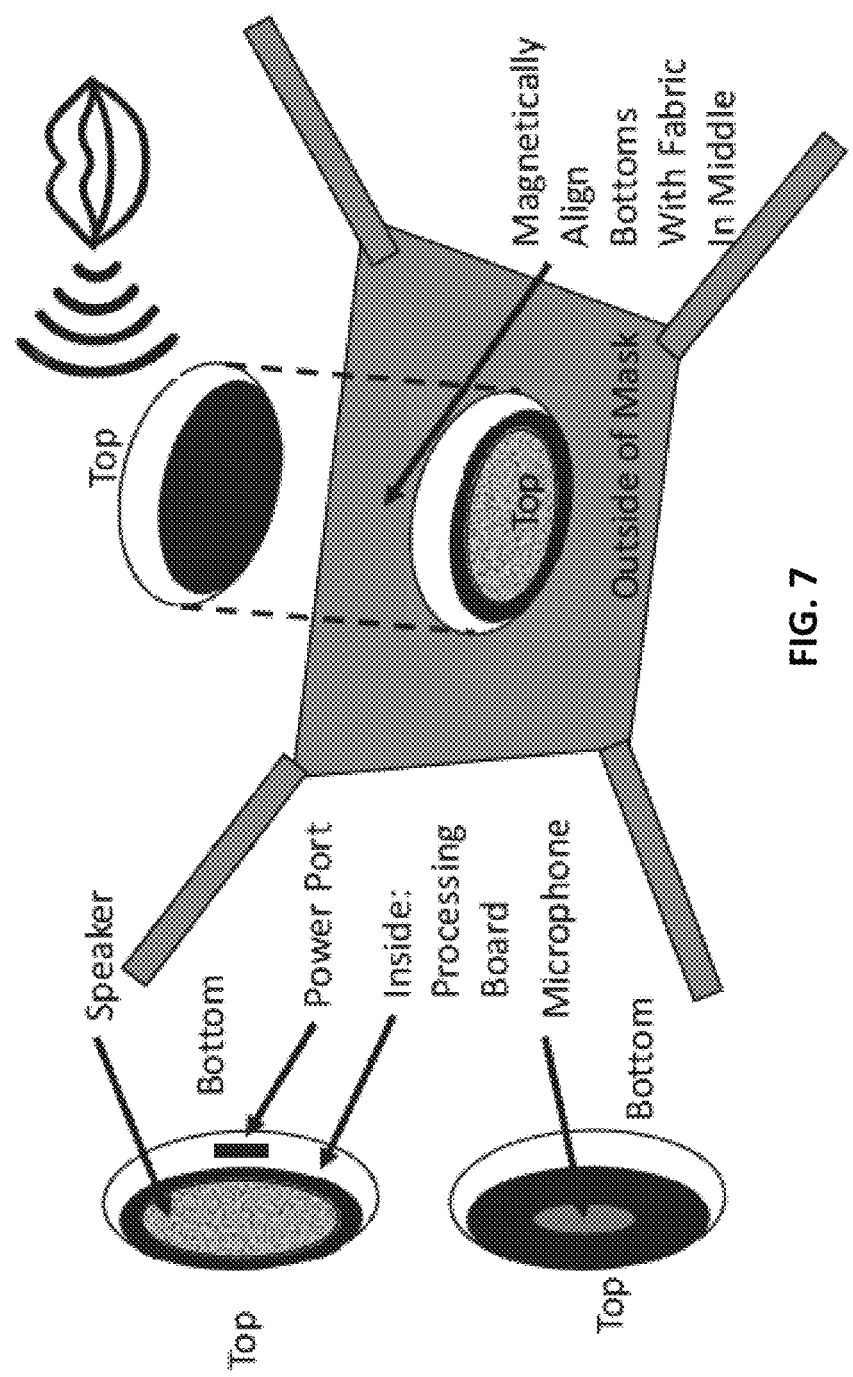
FIG. 7 is a perspective view of an embodiment of the disclosure showing a communication device having inner and outer elements, connectable across a mask.
Figure 8:
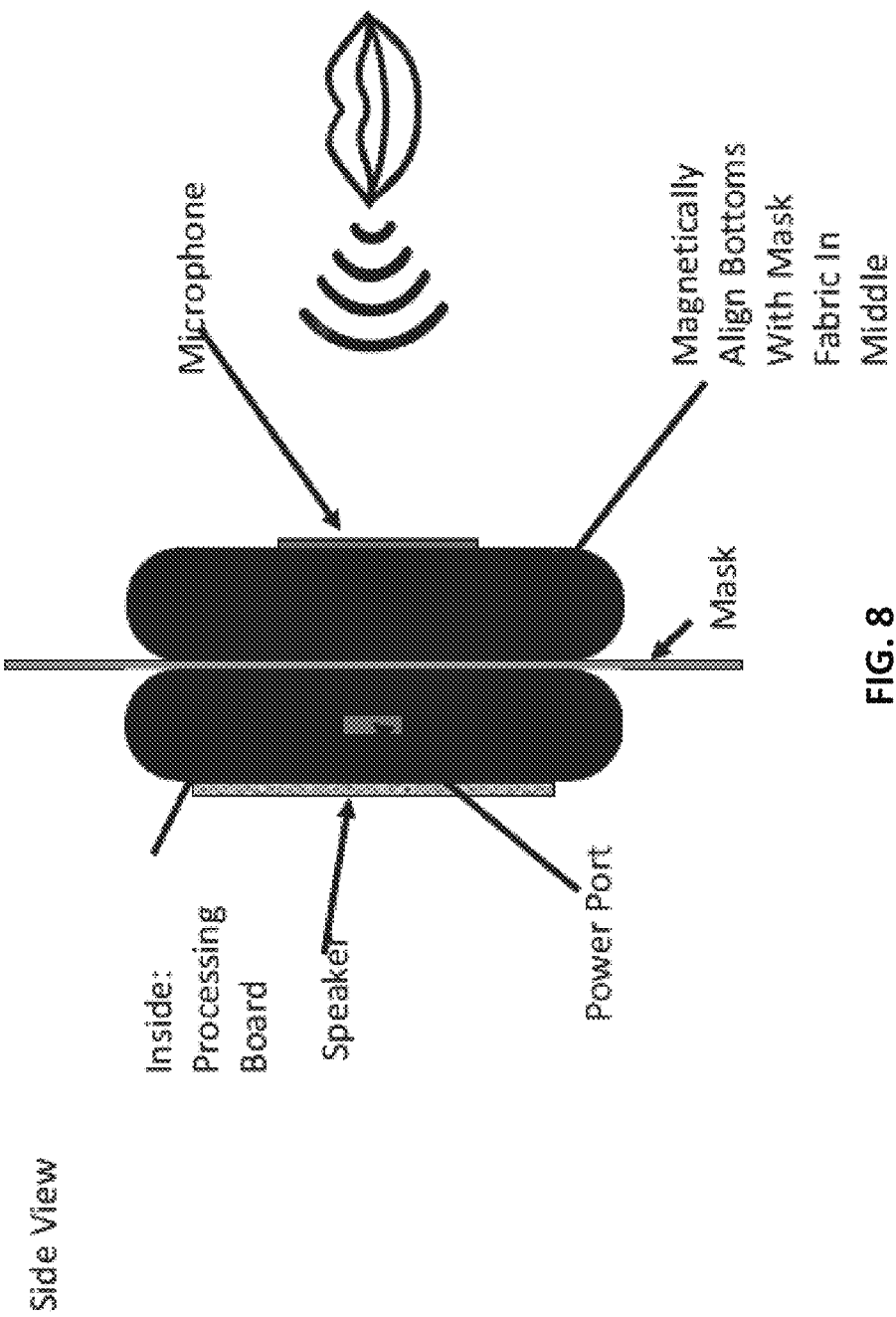
FIG. 8 is a side view of an embodiment of the disclosure depicting a communication device connectable across and through a mask.
Figure 9:
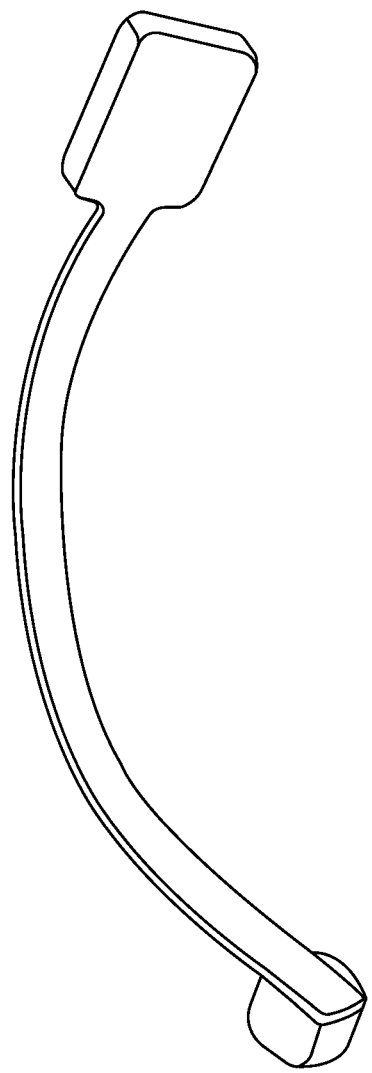
FIG. 9 is a side view of an embodiment of a communications device with a curvilinear design.
Figure 10:
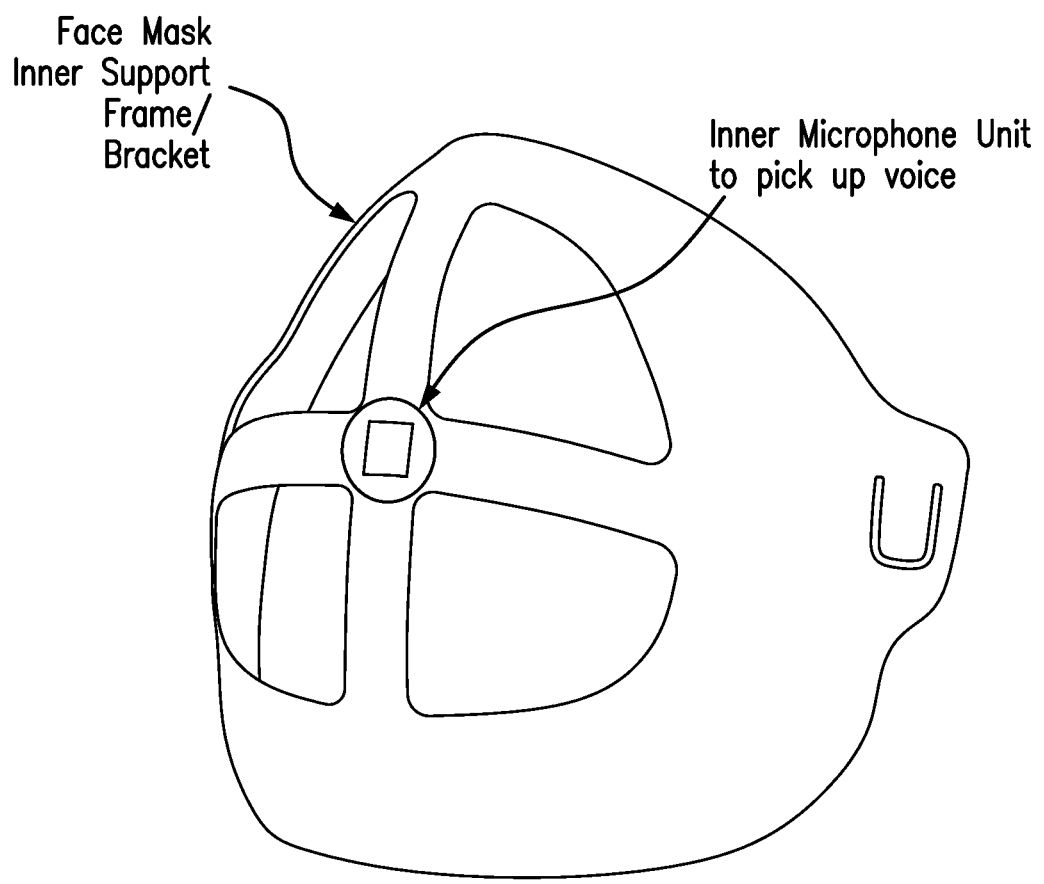
FIG. 10 is a depiction of a mask frame or support configured to secure an embodiment of a communication device.

In further embodiments, a cord can be configured with one or more clips to secure it to the hose 18 or as an integral part of the hose 18, for example embedded or permanently attached to the tube 18 or to a tube wiring harness. Exemplary wire harness clips 62 are illustrated as attaching a cord 24 to tube 18 in FIG. 6. In exemplary embodiments, the cord 24 is configured as a wiring harness secured at one or more places via harness clips 62, with the cord connectable to a coupler 22 (as in FIGS. 2 and 3) or a mask (as in FIG. 1). For any wired configurations, the remote (from the mask) end of the cord 24 may be configured to connect to additional components, such as a speaker, processor, network, power, etc.

Figure 11:
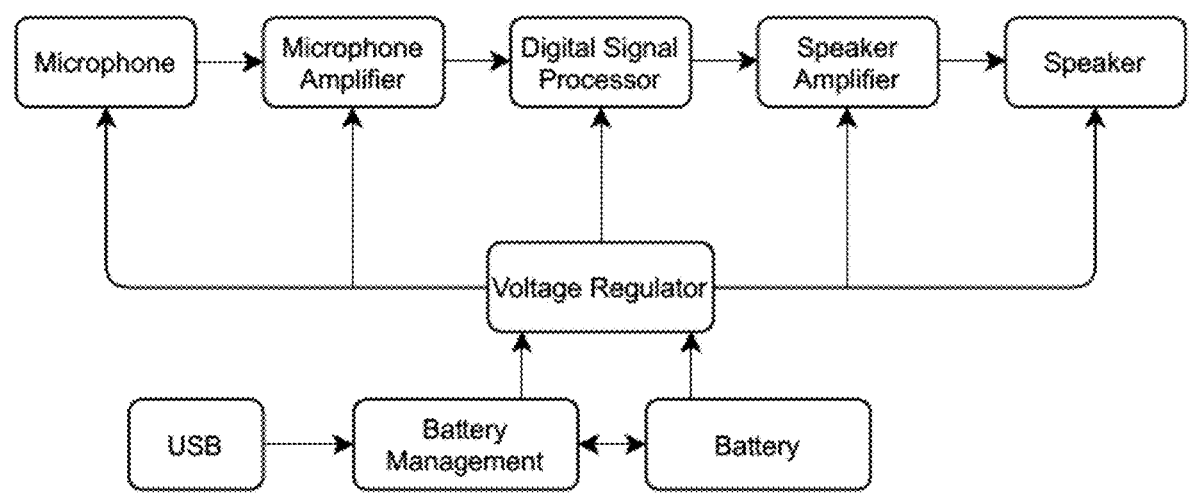
FIG. 11 is a block diagram illustrating the various components of an embodiment of the present invention.

The devices of the present invention can comprise several components. FIG. 11 is a block diagram illustrating the various components of an embodiment of the present invention. In this embodiment is illustrated a microphone, a microphone amplifier, a digital signal processor, a speaker amplifier, and a speaker. There is also a battery, battery management, a voltage regulator, and a USB. Other embodiments and configurations can be utilized.

Figure 12:
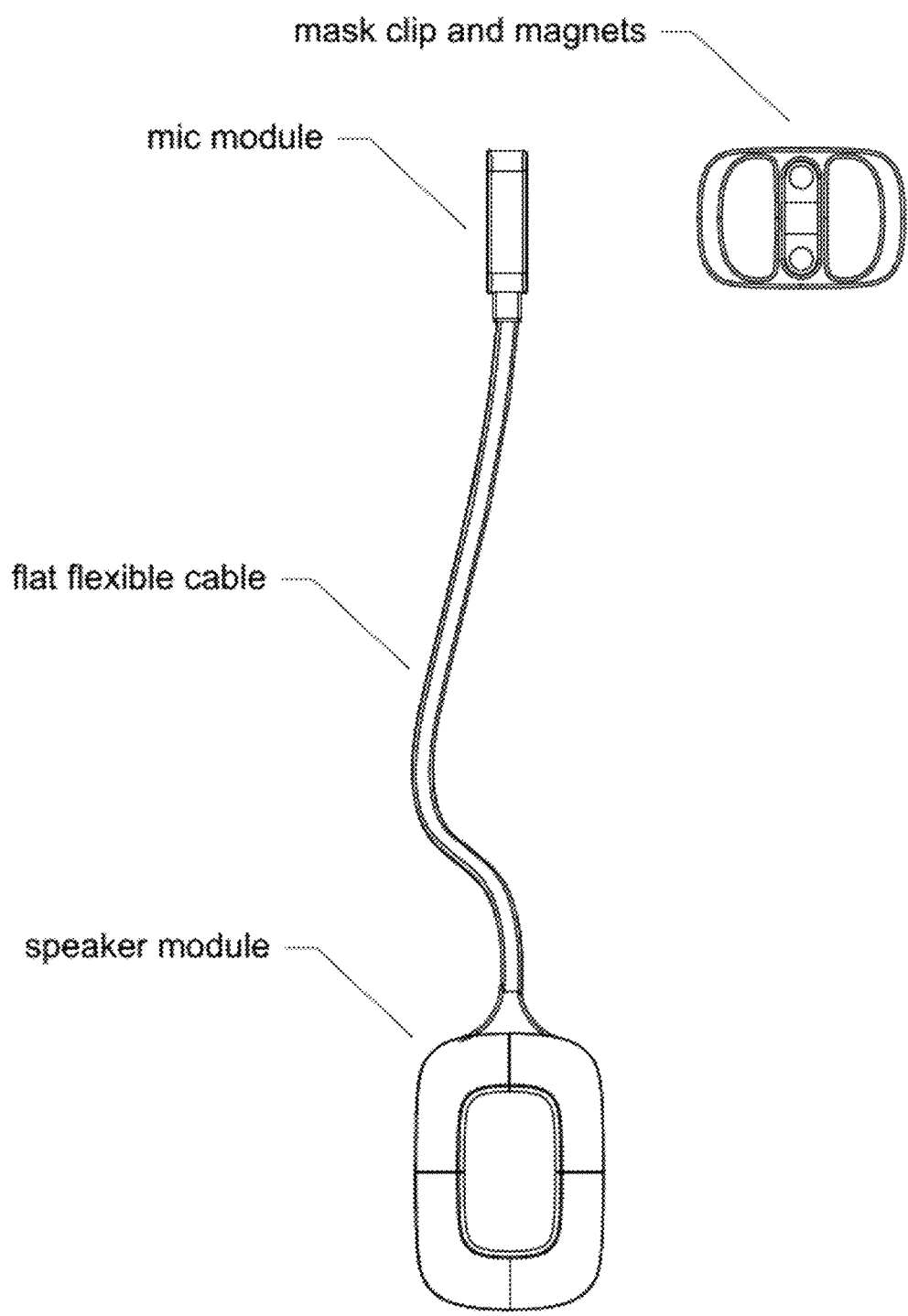
FIG. 12 is an embodiment of a device of the present invention showing a flat connecting flexible cable with a mic module and a speaker module.
Figure 13:
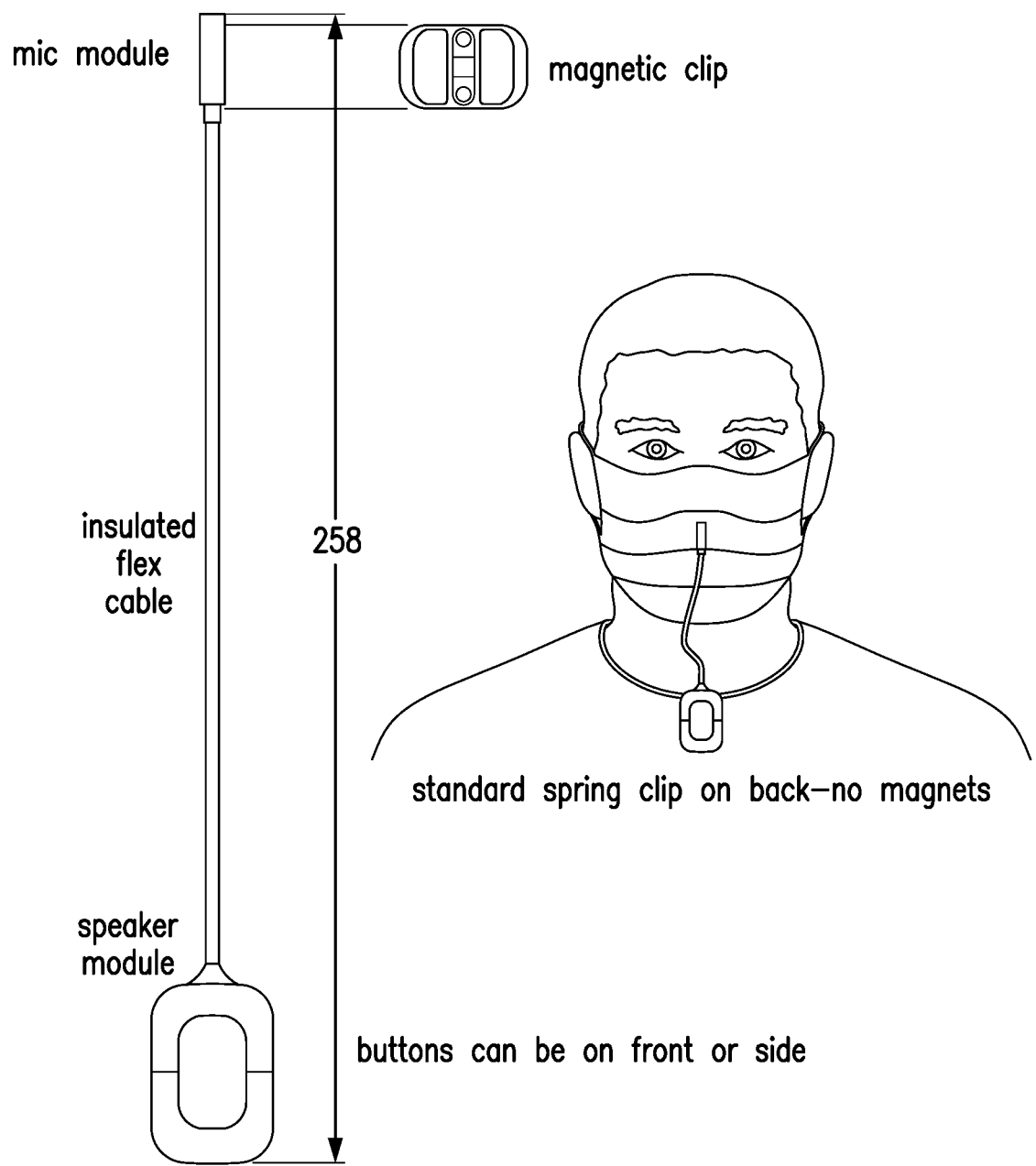
FIG. 13 is an illustration showing the device of FIG. 12 and also as worn by a user.

FIG. 12 shows an alternative embodiment of a device of the present invention showing a flat connecting flexible cable with a mic module and a speaker module, which can be worn by a mask user as shown in FIG. 13. The mic module portion is intended to engage with a mask clip, which can be engaged magnetically, for attachment to a mask that is interposed therebetween.

Figure 14:
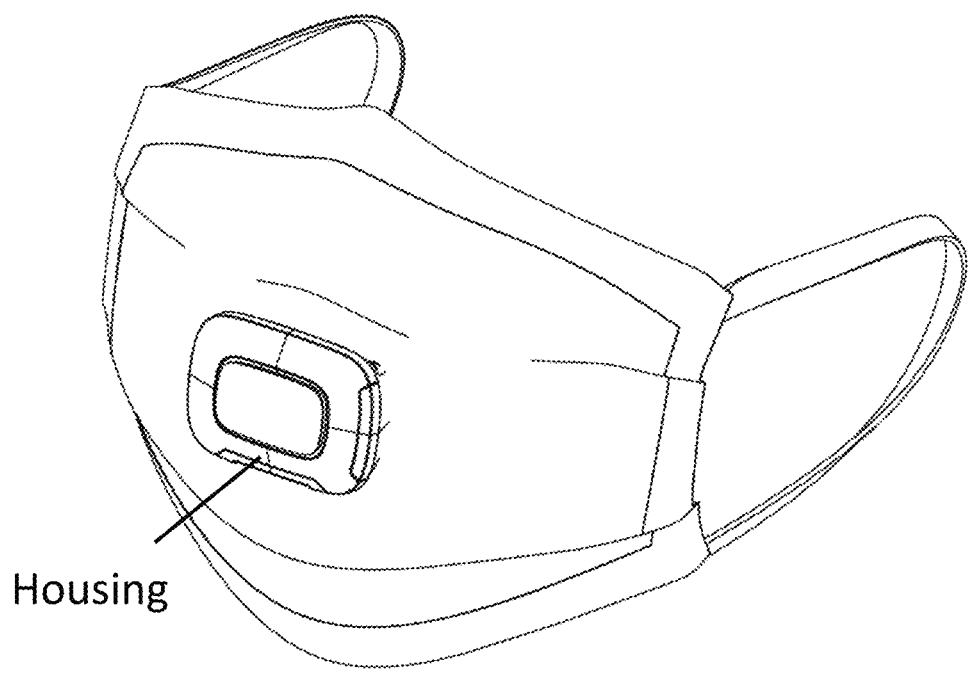
FIG. 14 is a perspective view of a device attached to the outside [front] of a mask.

The devices of the present invention can be attached to the front [outside] of a mask. FIG. 14 is a perspective view of a device attached to the outside [front] of a mask. The housing of the device is illustrated and a mask clip [not shown] would be positioned on the inside of the mask to engage with the housing.

Figure 15:
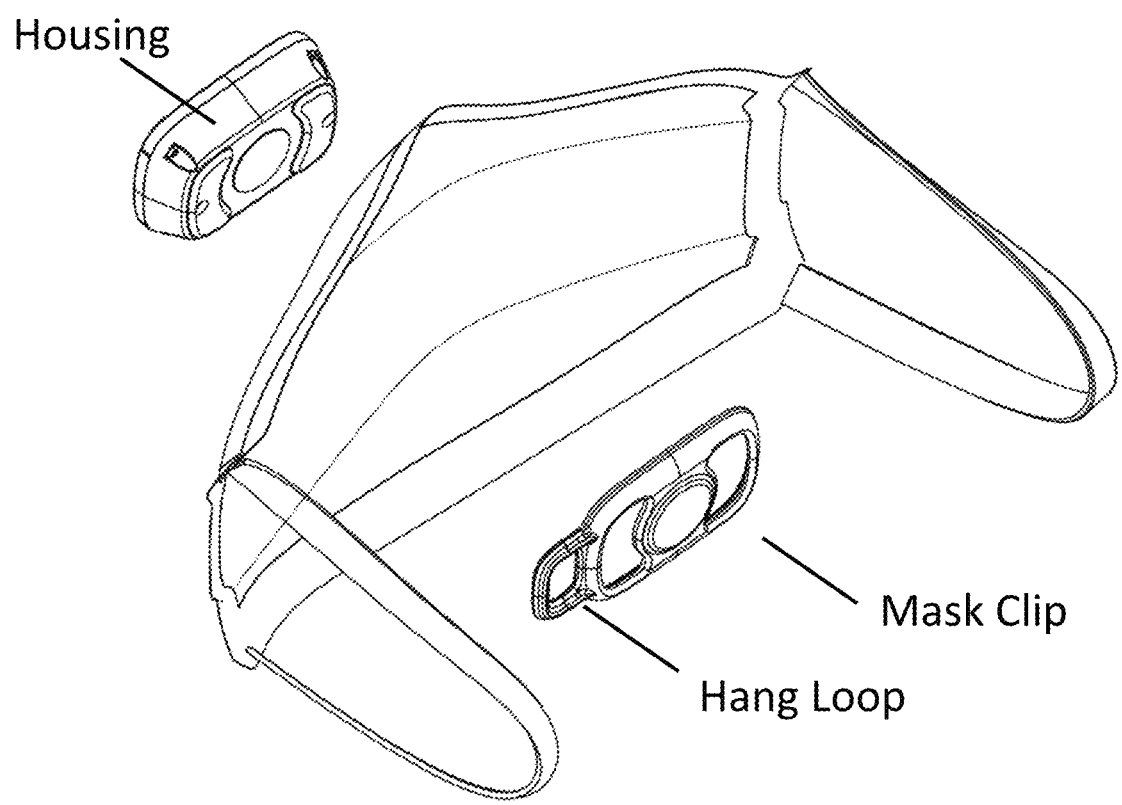
FIG. 15 is an exploded perspective view of a device with respect to a mask showing a housing that would attach to the front side of a mask and a mask clip that would attach to the back side of a mask with the mask interposed therebetween.

FIG. 15 is an exploded perspective view of a device as in FIG. 14 with respect to a mask showing a housing that would attach to the front side of a mask and a mask clip that would attach to the back side of a mask with the mask interposed therebetween.

Figure 16:
FIG. 16. is an illustration of the device on the outside front of a mask in use.

FIG. 16. is an illustration of the device on the outside front of a mask in use.

Figure 17:
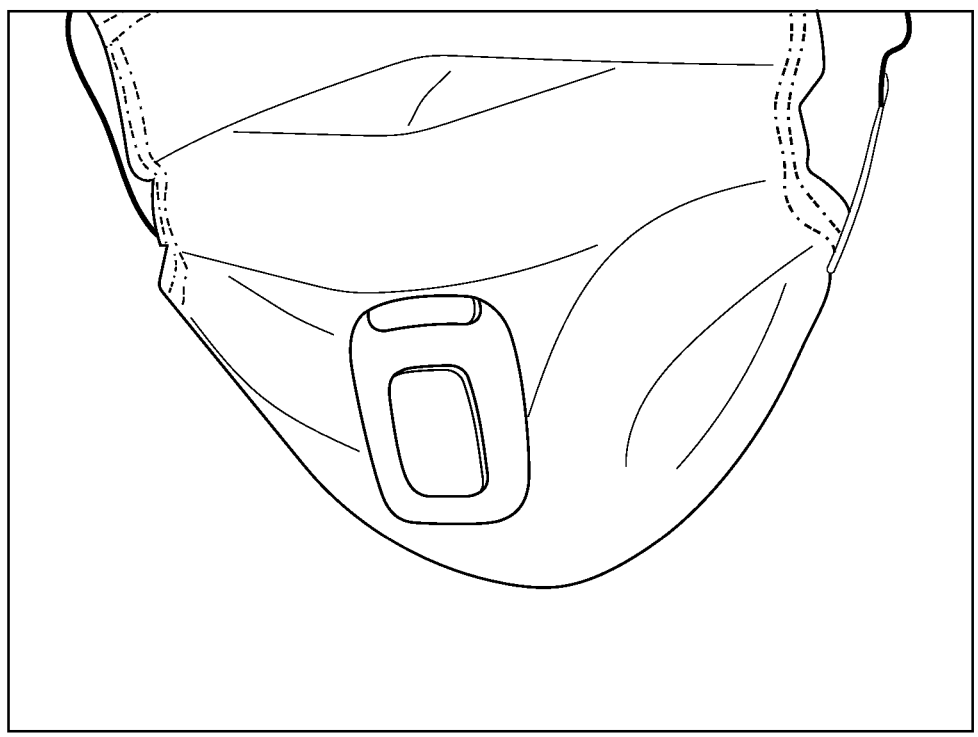
FIG. 17 is a photograph showing an embodiment of a device clipped to the outside front of a mask.

In use, the device is relatively small and light weight, e.g. not exceeding about 25 grams and also not exceeding about 17 grams. FIG. 17 is a photograph showing an embodiment of a device clipped to the outside front of a mask.

Figure 18:
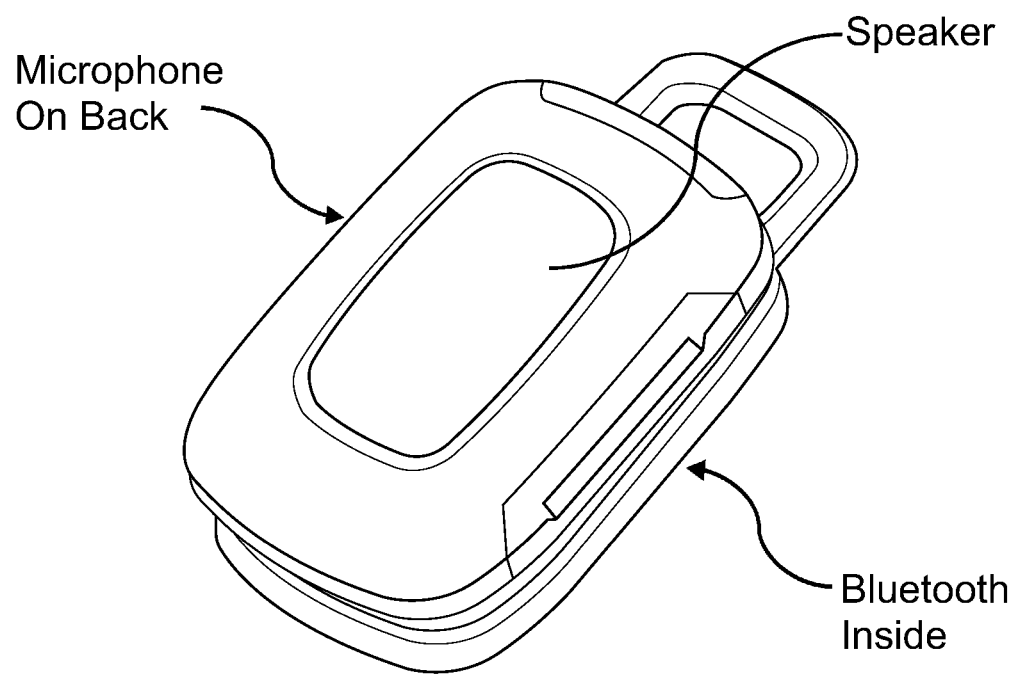
FIG. 18 is a drawing of an embodiment of a device indicating a speaker. Not shown is a microphone on the back of the device and a Bluetooth device inside.
Figure 19:
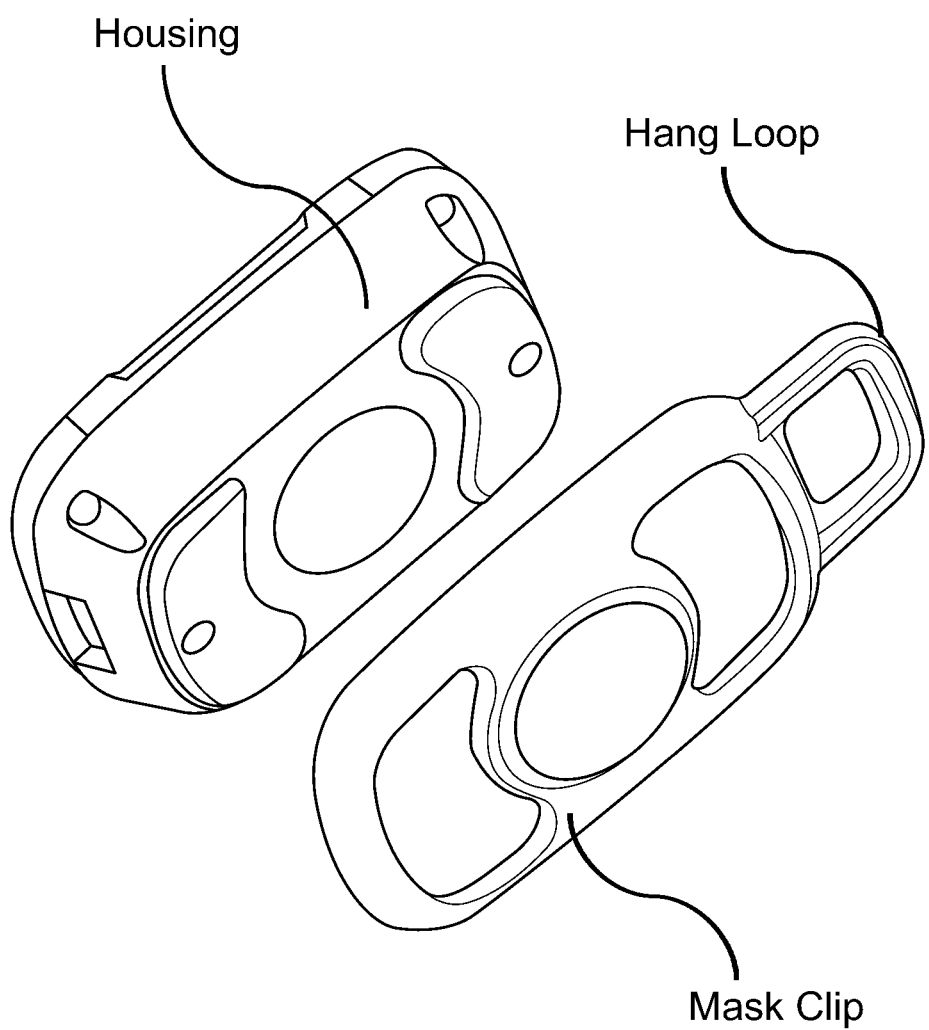
FIG. 19 is an exploded view of an embodiment of a device of FIG. 18 showing a housing and a mask clip with a hang loop [also referred to as a pull tab].

The compact nature of the device makes it ideal for extended use. FIG. 18 is a drawing of an embodiment of a device indicating a speaker. Not shown is a microphone on the back of the device and a Bluetooth device inside. The further exploded view of an embodiment of a device of FIG. 18 as shown in FIG. 19, depicts the housing and a mask clip with a hang loop [also referred to as a pull tab].

Figure 20:
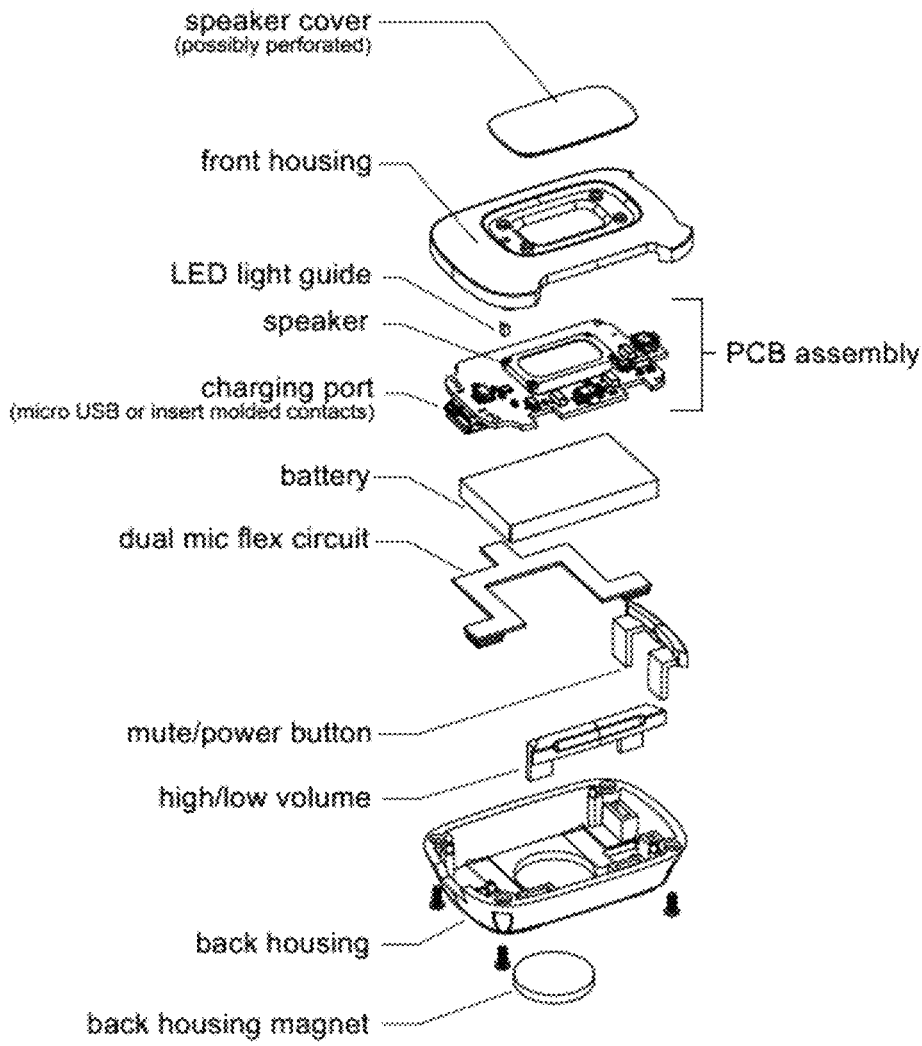
FIG. 20 is an exploded view of an embodiment of a device.
Figure 20:
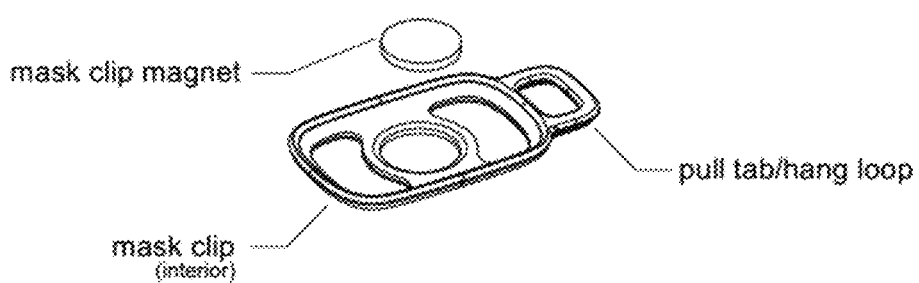
Figure 21:
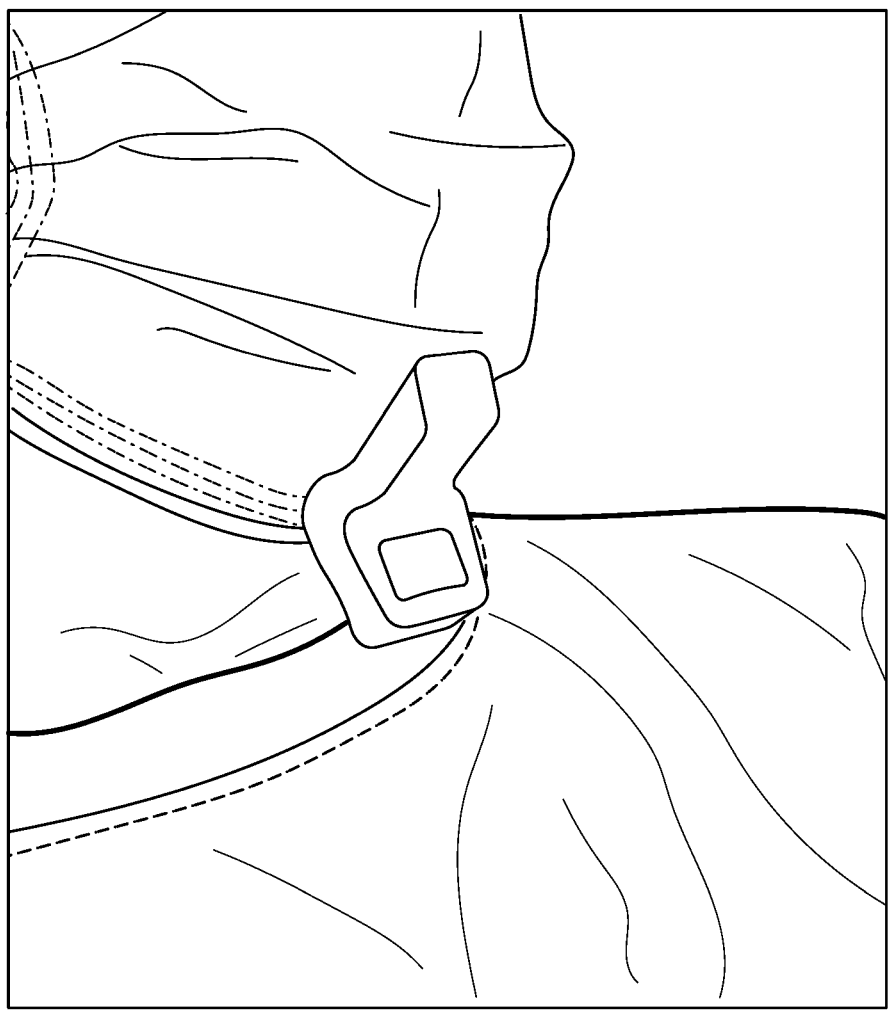
FIG. 21 is a photograph showing an embodiment of an L-shaped device clipped to the bottom of a disposable mask at the chin of a user.
Figure 22:
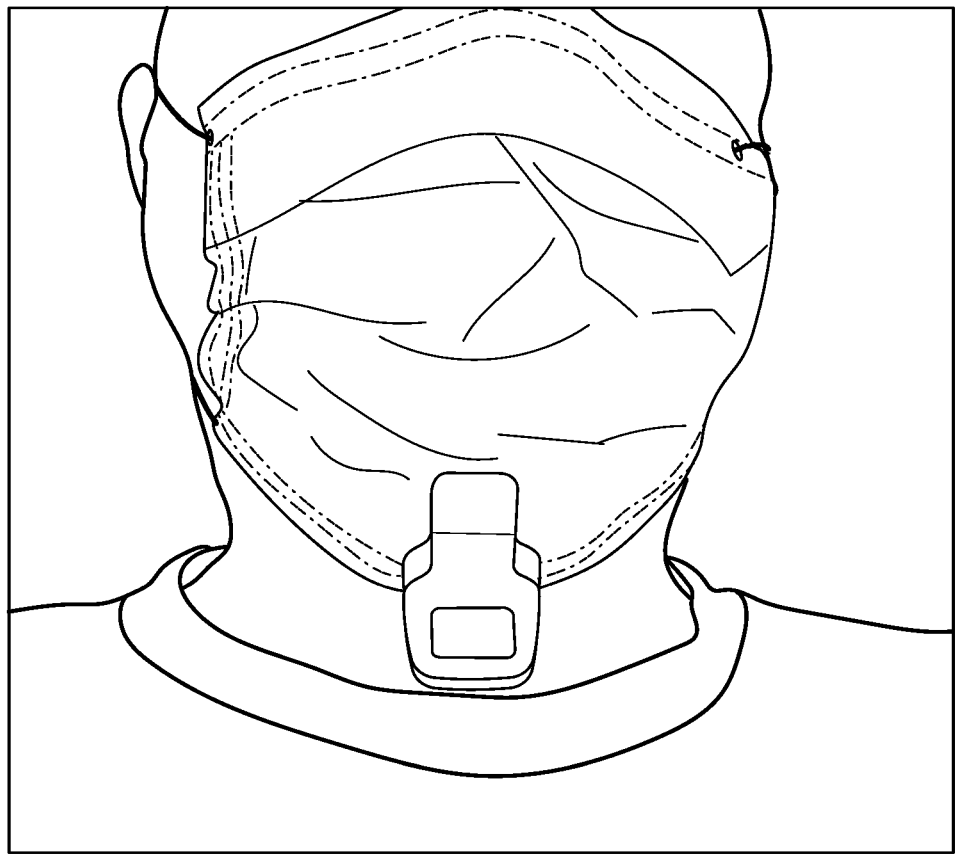
FIG. 22 is a photograph showing an embodiment of an L-shaped device clipped to the bottom of a disposable mask at the chin of a user.
Figure 23:
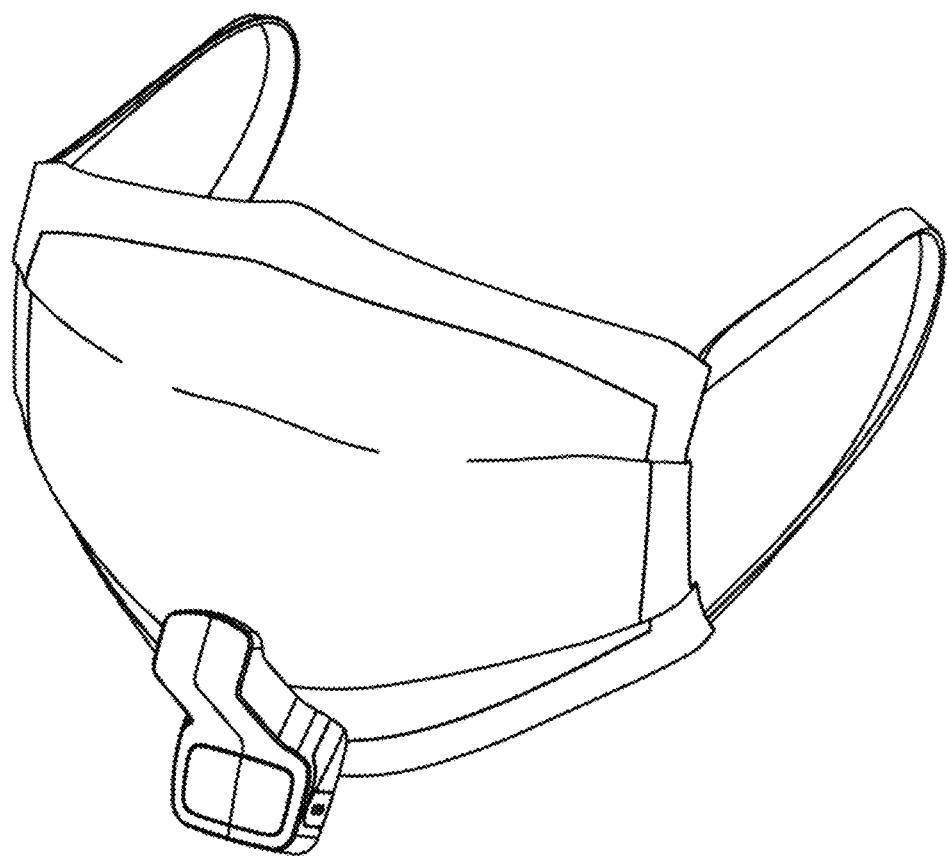
FIG. 23 is a drawing of an embodiment of an L-shaped device attached to the bottom of a mask on the front outside of a mask.

The components of the device fit neatly and compactly into a housing which is designed to engage with a mask clip. This is illustrated in an exploded view of an embodiment as in FIG. 20. In this embodiment, both the housing and the mask clip are shown with magnets. However, in other embodiments a single magnet can be employed to attractively couple with a ferromagnetic or ferrimagnetic component. A further embodiment of the present invention is an "L-shaped" device having an "L-shaped" housing and a corresponding "L-shaped" mask clip which are designed to engage with each other to attach the device to a mask. FIGS. 21 and 22 are photographs showing an embodiment of an "L-shaped" device clipped to the bottom of a disposable mask at the chin of a user. FIG. 23 is a drawing of an embodiment of an L-shaped device attached to the bottom of a mask on the front outside of the mask.

Figure 24:
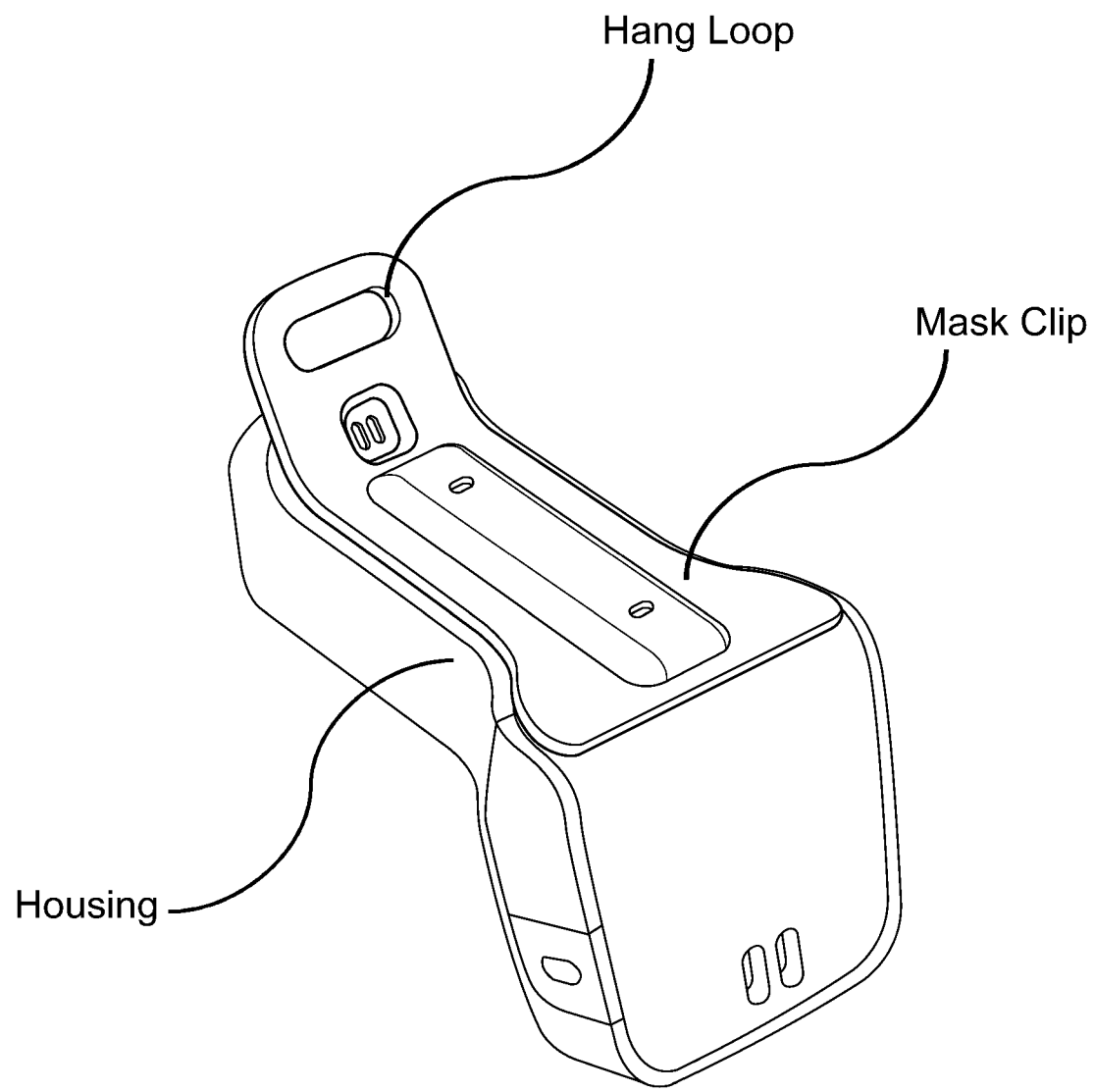
FIG. 24 is a drawing of an embodiment of an L-shaped device.
Figure 25:
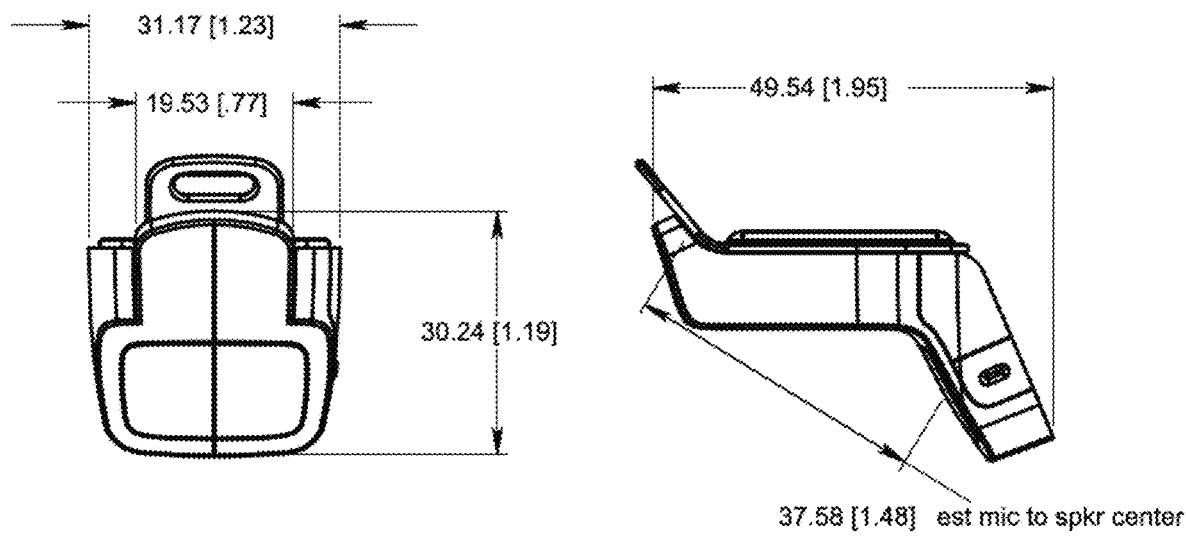
FIG. 25 is a drawing of an embodiment of an L-shaped device showing various exemplary dimensions in mm, and in inches in parentheses.
Figure 26:
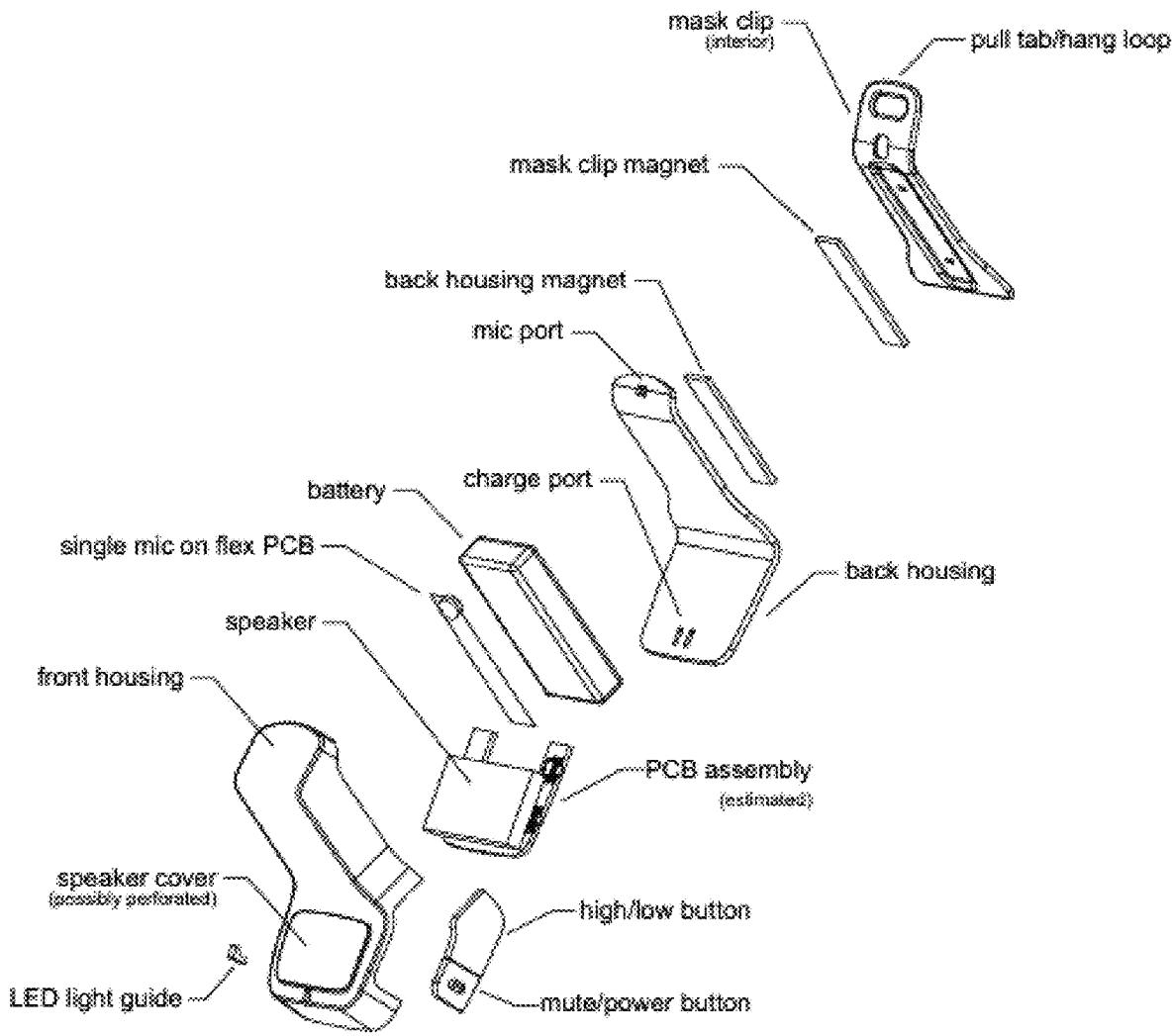
FIG. 26 is a drawing of an exploded view of an L-shaped device.

The "L-shaped" device is compact and light-weight, generally not exceeding about 25 grams and further no exceeding about 17 grams. FIG. 24 is a drawing of an embodiment of an L-shaped device in which the housing is shown as coupled [engaged] with a mask clip. In use, the mask would be disposed therebetween. The device can have various dimensions and FIG. 25 illustrates some of these in mm, with inches in parentheses. Referring to FIG. 26, additional detail and arrangement of the device components are shown in an exploded view.

Embodiments contemplate non-rechargeable, battery-driven Bluetooth® microphones as well as rechargeable battery Bluetooth® microphones with a port or cable or wireless connection for recharging via an external power source, or directly corded microphones (providing constant power).

In embodiments, the patient respiratory mask, inclusive of the Bluetooth® microphone, is configured as a disposable device. In exemplary embodiments, one or more components, such as the mask, coupler or hose, is configured as a disposable product to have a pre-determined working lifetime. In further exemplary embodiments, life indicators may be used to identify an end of the working respirator mask lifetime determined from unpacking from a sterile field. In a further embodiment, a battery in communication with the microphone is configured to expire or switch off at end of the working respirator mask lifetime.

In additional embodiments wherein one or more components is provided in the above-described coupler, such coupler may also, or in the alternative, include one or more life indicators.

In other embodiments, the patient respiratory mask and/or fluid delivery tube is configured to be reusable, with the Bluetooth® microphone being at least partially water resistant. In further embodiments, the Bluetooth® microphone is waterproof or is housed in a waterproof enclosure. In such exemplary embodiments, the patient respiratory mask and/or tube may be configured with a Bluetooth® microphone configured to withstand cleaning via use of cleaning agents, e.g., enzymatic cleaning solutions, rinses, disinfectants and pasteurizations, among others. Further exemplary embodiments provide a Bluetooth® microphone or microphone enclosure configured to withstand the effects of cleaning as well as effects of drying at utility or other stations.

Embodiments of the present disclosure also relate to an exemplary system with a patient respiratory mask positioned on a patient, the respiratory mask including a Bluetooth® noise cancelling microphone within or adjacent to the patient's fluid airspace, and at least one external Bluetooth® communications device. In the illustrated exemplary embodiment, a Bluetooth® speaker and a Bluetooth® smartphone are illustrated as being in communication with the microphone. In exemplary embodiments, at least the microphone and one external Bluetooth® communication device are pre-paired to permit instantaneous connection when within the proper proximity. In other exemplary embodiments, the Bluetooth® microphone continually broadcasts pairing information and is open for pairing subject to confirmation by the external Bluetooth® communications device. Other exemplary communications devices are also contemplated herein, including, without limitation, personal assistants, including media platforms such as the Google Home® or Amazon Echo/Tap/Alexa®, etc., that also might have a speaker that is usable for patient communications as well as the ability to accept commands for any of its functions (e.g., to play music or call someone via voice over Internet protocol or other means). Other exemplary embodiments have a speaker integral with the mask, coupler or fluid tube. Additionally, other communications protocols may be used in conjunction with the above-described wireless protocols and others (e.g., non- Bluetooth® wireless protocols), such as Wi-Fi.

As noted, a speaker or other communications device may be external or may be integrated into the mask portion, coupler or fluid delivery tube. Additionally, such speaker or other communications device can be configured to communicate wirelessly or in a wired mode. In a further exemplary aspect, both modes are configured, and the system is configured to automatically or manually (via a switch or application) switch modes.

In further embodiments an application running on a processor controls one or more aspects of the system, including without limitation: speaker or communications device mode; noise filtering/canceling or processing parameters; microphone parameters; wireless connections to devices; and monitoring for new devices in range.

In further embodiments, power for one or more components is supplied by a power cable with any convenient terminal ends, for example 110 volt outlet termination, USB, lightning connector, etc.

In other embodiments, bone induction or an in-ear, behind the ear or in-canal hearing aid provides or delivers a sound signal to the patient, with bone induction or hearing aid equipment wired to or wirelessly communicating with the respiratory mask system.

In embodiments, when the user (patient) of the respiratory mask speaks, the user's voice will be captured by the noise canceling microphone as the sound hits the interior structure of the mask and/or travels down the tube. Once the voice is captured in the device, it is transferred via Bluetooth® technology to a free-standing speaker where their voice will be amplified. In other exemplary embodiments, the voice is transferred to a speaker on the mask, coupler or tube where the voice will be amplified.

In other embodiments, the system is configured to distinguish between direct human interaction (conversation) and digital interaction (e.g., voice signals from a mobile phone) and automatically switch output to one of plural possible wireless communications devices depending on the detected signal. Alternative automatic or manual switching is further contemplated herein with regard to exemplary embodiments, for switching between a nearby Bluetooth® speaker and a communications device (e.g., a mobile telephone, facilitating patient conversation with a remote individual). In other embodiments, multiple Bluetooth® devices may be connected at the same time via bridging capabilities. Such a switching or bridging capability may be e.g., provided alongside the microphone or anywhere in range of the Bluetooth® microphone. In other embodiments, multiple Bluetooth® devices may be connected at the same time via multiple connections or modes.

It will be apparent to those skilled in the art that, while embodiments have been shown and described, various modifications and variations can be made to the invention disclosed herein without departing from the spirit or scope of the invention. Also, the exemplary embodiment described above should be read in a non-limiting fashion, both with regard to construction and methodology. Accordingly, it is to be understood that the various embodiments have been described by way of illustration and not limitation.

In an embodiment, the device may be a communications device dimensioned and configured to be used with a mask, or other device that is intended to cover a user's face, nose, mouth and/or head. Commonly used face masks make communication more difficult by lowering and muffling a user's voice. Wearing masks may reduce inherent effectiveness of the mask by requiring mask wearers to stand closer together, shout, or remove the mask to adequately communicate. The disclosed communication device when combined with a mask, allows disposable or reusable masks to improve the user's communication from a safe distance as well as when using a phone or other communication device.

A mask may be made of cloth, paper, cardboard, plastic, or other material. The mask may be used to conceal a user's identity, prevent the dissemination of the user's breath or expelled gases, liquids, or particulates. The mask may also protect the user from inhaling, or receiving on the face, other gases, liquids, or other particulates. Examples of masks include those selected from the group consisting of a cloth mask, fabric mask, disposable mask, single-use mask, surgical mask, procedure mask, medical mask, plastic mask, dust mask, filter mask, respirator mask, respiratory mask, oxygen mask, KN95 mask, N95 mask, surgical N95 mask, N99 mask, KN99 mask, N100 mask, KN100 mask, R95 mask, P95 mask, P100 mask, PM2.5 mask, FFP1 mask, FFP2 mask, FFP3 mask, a CPAP mask, a BiPAP mask, multilayered mask, mask with removable filter, a face covering, handkerchief, kerchief, veil, hood, bandana, mask with fitter, mask with brace, and combinations and layered arrangements thereof.

The communication device may be removably attachable to a disposable or reusable mask, which is particularly helpful to medical professionals, patients, first responders, or anyone who desires to cover their nose and mouth and/or filter the air they breathe or expel. The communication device may be reusable so that it may be removed from a first mask to subsequent masks. In an embodiment the communication device may be modular with multiple parts allowing it to attach to a mask. The communication device may include inner and outer housings, or just one inner or one outer housing. The communication device may be autoclavable or sterilizable, or disposable.

The inner and outer housings of the communication device may each include all other necessary components for successful operation of the communication device. The housings may be constructed of any reasonable material for commercial, personal, or medical devices, such as plastics, metals, woods, or man-made or natural materials. Each housing may also include elements to secure the inner and outer housings to the mask, and to create a connection between the inner and outer housings. In order to connect the inner and outer housings to the mask, the inner and outer housings may include a mechanical clip, a spring, a magnet, pins, hook and loop, snaps, buttons, glue or other adhesives, zippers, stitches, strings, ties, staples, suction, or other connective means. Certain features (e.g. snaps, buttons, zippers) may be complementary to features on the mask. The housings may be configured to slip into and reside in a pocket or other means for securement on the mask. The inner the outer housing may be configured to attach to eyeglasses, a hat, or other wearable item which allows the inner housing to be in close proximity to the user's mouth or nose.

The inner and outer housings may each include complementary magnetic attachments which allow the inner and outer housing to attach to one another, separated by the mask. Magnetic attachments create a secure and movable connection on the mask. The magnetic attachments may be a ring on each housing, which creates a secure connection between the inner and outer housing, and securely attaches the communication device to the mask. The complementary magnetic attachments pair to one another across the mask, yet still allow electrical signals to pass between the inner and outer housing. The complementary magnetic attachments may be a ring, or a square, or any other shape with an open center. The complementary magnetic attachments may also be a plurality of complementary magnetics on each of the inner and outer housings. The complementary magnetic attachments may have the ability to attach designs or otherwise showcase messages to the outer housing as a form of free speech or advertising.

The inner and outer elements may also be dimensioned in a curvilinear form, complementary to each other. The curvilinear form of the inner element may be placed inside the mask extending from one side to the other crossing the area in front of the user's mouth. A speaker may be located in a central location between the sides so that it is close to the user's mouth. Other features, such as electrical and attachment features, of the inner element may be located along the curvilinear form flanking the microphone. The curvilinear outer element may attach to the inner element by magnetic attachments at locations complementary to the inner element. In other embodiments, the elements may be part of, or attached to, an inner support frame/bracket that supports the form of the mask on the user's face.

The inner and outer housings may contain a power source. The power source may be in both housings, or the power source may be in only one of the housings. The power source may be a replaceable or rechargeable battery. Because of the close proximity of the housings, power may flow, via induction or other modalities, from the powered housing to the non-powered housing, through the mask. Alternatively, a physical connection, as described above, may span between the inner and outer elements to provide power to the non-powered element or exchange data between the elements. In it also contemplated that the device may mate with a mask having an existing port (for airflow, etc) allowing a suitable path for a physical connection between the inner and outer elements.

One or both of the inner and outer housings may include a port and/or cable for a power source or power charging, or for data transfer. The port and/or cable may connect the housing, the element, and the device to another system for data or signal processing, charging, external speakers or communication, or any other relevant system.

The inner element may be located inside the mask in close proximity to the user's mouth, to easily pick up the user's voice. The inner element may act as or include a microphone and a transmitter. The inner element may transmit a signal, of the user's voice, to the outer element. The outer element may be releasably attachable to the outside of the mask. The outer element may include a transmitter, a receiver, and a speaker, to receive the signal from the inner element and then project the user's voice. The user's voice may be projected via the speaker in the outer housing or the inner or outer housings may also transmit the voice signal to an external speaker or system. The speaker in the outer housing may project the user's voice along or in combination with an external speaker or system. The microphone, speaker, and electrical processing may include any of the elements described above. The speaker may include a flared housing, such as a bull-horn to increase the user's voice. The transmission of signal between the inner element and the outer element may be wireless or may be via a physical connection between the elements. A wireless transmission between the inner and outer elements is suitable for a reusable mask or disposable mask. The transmission of electrical signal through the physical connection may include an element, extending from the inner or outer element, that pierces through a disposable mask and makes a physical and electrical connection with the other of the inner or outer element. This connection is suitable for a disposable mask or may be used with a reusable mask.

The communication device may also include sensors for detecting ambient or expelled gas mixtures or temperature. Monitoring gases, like air quality, and temperature may be helpful in respiratory therapy of patients, for first responders, or in any scenario where a user needs a mask. The device may include a separate membrane or filter used to sample or analyze, in real time, ambient or expelled air quality for contaminants, particulates, or pathogens. The membrane may be removable, replaceable, or cleanable. Sensors in the device may include a relative or absolute humidity sensor, a temperature sensor, a dew point sensor, an enthalpy sensor, a pressure sensor, a barometric sensor, a flow rate sensor, an oxygen sensor, a carbon monoxide or dioxide sensor, a nitrogen sensor, or a combination thereof. The sensors may detect or monitor characteristics not associated with air quality, these sensors may include acoustic sensors, light sensors, cameras, ambient temperature sensors, accelerometers, or any sensor pertinent to expelled or ambient environments. It is also contemplated that a sensor may be external to the device, but connects to a port on one or both of the inner or outer housings.

In operation, the device may detect a user's voice or sound via a microphone and reproduce that sound via a speaker. The device may include a microphone, a speaker, a processor, a battery (single use or rechargeable), a charging/data port, communications such as Bluetooth®, volume controls, lights, light-emitting displays (LEDs), a camera, a video screen, measuring ports with the ability to electronically measure breathing (and/or vapor exiting the user's mouth), noise, speech, tones, etc. The microphone may be noise canceling. The device may provide for communication between the inner and outer elements and any external system by any wired or wireless connection, such as RFID, WiFi, Bluetooth®, Zigbee, Zwave, 2G, 3G, 4G, 5G, or any reasonable later-developed wireless modality.

The device may also include a feedback unit for the user, such as a headphone or an in-ear component. The feedback unit may assist the user in hearing the user's voice. The feedback unit may also include an external microphone embedded in the outer element or connected to, but separate from, the outer element. The external speaker may transmit sound to the user's ear. The feedback unit may be dimensioned and configured to include additional microphones in other locations around the user, such as at the user's throat. The feedback unit may be useful for masks, helmets, or other item that covers or isolates the user's head.

It is contemplated that the device may include any other reasonable technology, system, or processes to assist in communication between a user and another. These technologies include microprocessors, microcontrollers, computer chips, programmable algorithms for processing the data of the device (including sound), any component for capturing sound and human voice, speakers and any technology used to project sound and human voice, noise cancellation technology, wireless capabilities for communication between the microphone and the speaker as well as between the device and remote devices such as external speakers, portable/cellular phones, watches, computers, and televisions. The device may include voice enhancing technology and voice recognition/voice regeneration technology as well as voice command technology as found in personal digital assistants like Amazon® Alexa®. The device may include machine learning and other programming code that will learn the voice of the user and optimize the system for that voice or regenerate voice in that user's voice. This voice may be increased in volume based on settings on the device and voice processing in the unit. This voice might be changed, such as via an electronic voice synthesizer or similar technology. The device may include hardware or software acoustic filters in the device that may screen out non-human voice range sounds.

The details of one or more embodiments of the invention are set forth in the accompanying description below. Although any materials and methods similar or equivalent to those described herein can be used in the practice or testing of the present invention, the preferred materials and methods are now described. Other features, objects and advantages of the invention will be apparent from the description. In the description, the singular forms also include the plural unless the context clearly dictates otherwise. Unless defined otherwise, all technical and scientific terms used herein have the same meaning as commonly understood by one of ordinary skill in the art to which this invention belongs. In the case of conflict, the present description will control.

Equivalents and Scope

Those skilled in the art will recognize, or be able to ascertain using no more than routine experimentation, many equivalents to the specific embodiments in accordance with the invention described herein. The scope of the present invention is not intended to be limited to the above Description, but rather is as set forth in the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The invention includes embodiments in which exactly one member of the group is present in, employed in, or otherwise relevant to a given product or process. The invention includes embodiments in which more than one, or the entire group members are present in, employed in, or otherwise relevant to a given product or process.

It is also noted that the term "comprising" is intended to be open and permits but does not require the inclusion of additional elements or steps. When the term "comprising" is used herein, the term "consisting of" is thus also encompassed and disclosed.

Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the invention, to the tenth of the unit of the lower limit of the range, unless the context clearly dictates otherwise.

In addition, it is to be understood that any particular embodiment of the present invention that falls within the prior art may be explicitly excluded from any one or more of the claims. Since such embodiments are deemed to be known to one of ordinary skill in the art, they may be excluded even if the exclusion is not set forth explicitly herein. Any particular embodiment of the compositions of the invention (e.g., any antibiotic, therapeutic or active ingredient; any method of production; any method of use; etc.) can be excluded from any one or more claims, for any reason, whether or not related to the existence of prior art.

It is to be understood that the words which have been used are words of description rather than limitation, and that changes may be made within the purview of the appended claims without departing from the true scope and spirit of the invention in its broader aspects.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

What is claimed is:

1. A communication device for releasable magnetic securement to a flexible mask, the device comprising:
   a microphone configured to receive speech from the mask wearer;
   a housing comprising a speaker configured to broadcast the speech from the mask wearer; and
   a first magnetic attachment component and a complementary second magnetic attachment component to magnetically secure the housing to the flexible mask;
   wherein the first magnetic attachment component is associated with a back of the housing and
   the complementary second magnetic attachment components is arranged to produce an attractive force to the first magnetic attachment component to releasably secure the back of the housing to the mask.

2. The device of claim 1 wherein the magnetic attachment components are each independently selected from the group consisting of a magnet, a ferromagnetic material, and a ferrimagnetic material.

3. The device of claim 1, further comprising:
   a power indicator;
   a printed circuit board (PCB) assembly including the speaker;
   a power source for supplying power to the device; and
   a device control element,
   wherein the device control element comprises at least one of a power control, a volume control, and a mute control.

4. The device of claim 1, wherein the first and second magnetic attachment components are arranged to produce an attractive force sufficient to couple the housing to the mask clip with a flexible mask interposed therebetween.

5. The device of claim 4 wherein the flexible mask is selected from the group consisting of a cloth mask, fabric mask, disposable mask, single-use mask, surgical mask, procedure mask, medical mask, dust mask, filter mask, oxygen mask, KN95 mask, N95 mask, surgical N95 mask, N99 mask, KN99 mask, N100 mask, KN100 mask, R95 mask, P95 mask, P100 mask, PM2.5 mask, FFP1 mask, FFP2 mask, FFP3 mask, a multilayered mask, mask with removable filter, a face covering, handkerchief, kerchief, veil, hood, bandana, mask with fitter, mask with brace, and combinations and layered arrangements thereof.

6. A device for communicating with a mask wearer, the device comprising:
   a microphone configured to receive speech from the mask wearer;
   a speaker configured to broadcast speech from the mask wearer; and
   a housing comprising the microphone and speaker,
   wherein the housing is substantially L-shaped to conform to a human chin when mounted to the flexible mask in an under-chin position, and
   wherein the device has a total weight sufficient for attachment of the device to a flexible mask, the total weight not exceeding about 25 grams.

7. The device of claim 6, further comprising a mask clip for engaging the housing, wherein at least one of the mask clip and the housing comprises a stabilizing protrusion for mating with an opening on the other and wherein the housing and mask clip when in an engaged state with the flexible mask interposed therebetween engage with sufficient force to cause the flexible mask to conform to the engaged stabilizing protrusion and opening.

8. The device of claim 7 further comprising a first magnetic attachment component associated with a back of the housing and a second magnetic attachment component associated with the mask clip; wherein at least one of the first and second magnetic attachment components is a magnet and the first and second magnetic attachment components are arranged to produce an attractive force sufficient to couple the back of the housing to the mask clip with the flexible mask interposed therebetween;
   and wherein the magnetic attachment components are selected from the group consisting of a magnet, a ferromagnetic material, and a ferrimagnetic material.

9. The device of claim 6, further comprising:
   a power indicator;
   a printed circuit board (PCB) assembly including the speaker;
   a power source for supplying power to the device; and
   a device control element,
   wherein the device control element comprises at least one of a power control, a volume control, and a mute control.

10. The device of claim 6, wherein the device has a total weight sufficient for attachment of the device to a flexible mask for a period of at least about 30 minutes, the total weight not exceeding about 17 grams.

11. A communication device for releasable magnetic securement to a flexible mask, the device comprising:
    a housing comprising a microphone configured to receive speech from the mask wearer;
    a first magnetic attachment component and a complementary second magnetic attachment component to magnetically secure the housing to the flexible mask; and
    a speaker configured to broadcast the speech from the mask wearer;
    wherein the first magnetic attachment component is associated with a back of the housing and
    the complementary second magnetic attachment components is arranged to produce an attractive force to the first magnetic attachment component to releasably secure the back of the housing to the mask.

12. The device of claim 11, wherein the speaker is contained within a speaker module, the speaker module further comprising one or more of:
    a power indicator;
    a printed circuit board (PCB) assembly including the speaker;
    a power source for supplying power to the device and one or more components thereof; and
    a device control element,
    wherein the device control element comprises at least one of a power control, a volume control, and a mute control.

13. The device of claim 11 wherein the magnetic attachment components are each independently selected from the group consisting of a magnet, a ferromagnetic material, and a ferrimagnetic material.

14. The device of claim 12, wherein the microphone is in wired communication with the speaker module.

15. The device of claim 11, wherein the microphone is operatively connected to the speaker such that the speech received from the mask wearer is amplified and broadcast through the speaker.

16. The device of claim 15, wherein the microphone is operatively connected to the speaker through one or more of a microphone pre-amplifier, an equalization component, a sound output component, and an amplifier.

17. The device of claim 12 further comprising, within the speaker module, a circuit assembly comprising a wireless receiver and/or transmitter, wherein the microphone is in wireless communication with the housing.

18. The device of claim 11, wherein the first and second magnetic attachment components are arranged to produce an attractive force sufficient to couple the microphone to the mask clip with a flexible mask interposed therebetween.

19. The device of claim 18 wherein the flexible mask is selected from the group consisting of a cloth mask, fabric mask, disposable mask, single-use mask, surgical mask, procedure mask, medical mask, dust mask, filter mask, oxygen mask, KN95 mask, N95 mask, surgical N95 mask, N99 mask, KN99 mask, N100 mask, KN100 mask, R95 mask, P95 mask, P100 mask, PM2.5 mask, FFP1 mask, FFP2 mask, FFP3 mask, a multilayered mask, mask with removable filter, a face covering, handkerchief, kerchief, veil, hood, bandana, mask with fitter, mask with brace, and combinations and layered arrangements thereof.

20. The device of claim 11, wherein each of the magnetic attachment components are defined by complementary shapes with open centers selected from the group consisting of rings or squares.

* * * * *